United States Patent
Fujiwara et al.

(10) Patent No.: US 7,545,934 B2
(45) Date of Patent: *Jun. 9, 2009

(54) SECURITY INFORMATION PACKAGING SYSTEM, LSI, AND SECURITY INFORMATION PACKAGING METHOD

(75) Inventors: Makoto Fujiwara, Kyoto (JP); Yusuke Nemoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 777 days.

This patent is subject to a terminal disclaimer.

(21) Appl. No.: 11/092,946

(22) Filed: Mar. 30, 2005

(65) Prior Publication Data

US 2005/0226410 A1 Oct. 13, 2005

(30) Foreign Application Priority Data

Mar. 31, 2004 (JP) .......................... P.2004-103404

(51) Int. Cl.
H04L 9/00 (2006.01)
(52) U.S. Cl. ...................................... 380/45
(58) Field of Classification Search ................ 713/193; 380/28, 44, 45
See application file for complete search history.

(56) References Cited

U.S. PATENT DOCUMENTS

| 6,240,516 | B1 | 5/2001 | Vainsencher | |
| 2002/0129246 | A1* | 9/2002 | Blumenau et al. | 713/168 |
| 2002/0194476 | A1* | 12/2002 | Lewis et al. | 713/169 |
| 2003/0074571 | A1 | 4/2003 | Fujiwara | |
| 2006/0101288 | A1* | 5/2006 | Smeets et al. | 713/194 |

FOREIGN PATENT DOCUMENTS

| JP | 01-270684 | 10/1989 |
| JP | 04-135260 | 5/1992 |
| JP | 11-215117 | 8/1999 |
| JP | 2003-101527 | 4/2003 |

OTHER PUBLICATIONS

Menezes, et al, "Handbook of Applied Cryptography", CRC Press Series on Discrete Mathematics and Its Applications, 1997, pp. 567-570, 577-581, 546-553, XP002356115, Boca Raton, Florida.
Japanese Notification of Reasons for Rejection, w/ English translation thereof, issued in Japanese Patent Application No. JP 2004-103404 dated Jan. 8, 2009.

* cited by examiner

*Primary Examiner*—Ellen Tran
(74) *Attorney, Agent, or Firm*—McDermott Will & Emery LLP

(57) ABSTRACT

To make the strict management of the security information possible, in a security information packaging system 120 which comprises a storing portion 120a for storing first encrypted security information EDK(MK)/address obtained by encrypting final security information DK by using internal security information MK and second encrypted security information EMK(CK)/address obtained by encrypting the internal security information MK by using converted security information CK, and an LSI 120b, the LSI 120b includes a seed generating portion 131 for storing a first constant IDfuse/address containing address information and serving as a generation source of a conversion seed and a second constant IDtst serving as a generation source of a conversion seed for testing and a third constant Const and then outputting either the conversion seed or the conversion seed for testing in response to a test signal.

30 Claims, 21 Drawing Sheets

SECURITY INFORMATION PACKAGING SYSTEM, LSI, AND SECURITY INFORMATION PACKAGING METHOD

BACKGROUND OF THE INVENTION

1. Field of the Invention

The present invention relates to a security information packaging system, an LSI used to implement this system, a memory portion, and a security information packaging method.

2. Description of the Related Art

The key information necessary to decrypt the encrypted information are embedded in the storage device such as DVD (Digital Versatile Disk), SD card (Secure Digital memory card), etc. which store the contents a copyright of which should be protected therein, the system LSI of the terminal device for playing or demodulating the storage device, and so forth.

By way of the copyright protection and the illegal use prevention, the key information is the strict confidential matter to the user as well as the manufacturer of the terminal device. In other words, such key information is strictly managed in the development stage of the system LSI in which the key information is embedded, the fuse packaging stage as one of steps of manufacturing the system LSI, and the set packaging stage in which the system LSI is combined with the memory, etc. to manufacture the terminal device.

The applicant of this application disclosed previously the key packaging system that is capable of improving the confidentiality and the concealability of the key by distributing the security information into the system in which the key is packaged and the LSIs used therein, and capable of packaging easily various security keys, and also capable of testing the packaged value without an increase of the circuit scale (see JP-A-2003-101527, FIG. 14, for example).

FIG. 19 is a block diagram showing a schematic configuration to explain a key packaging system 7 disclosed in the above Literature. Here, in the following description, explanation will be made of encrypting and decrypting processes on the premise of the symmetric cryptosystem. The "symmetric cryptosystem" has such a characteristic that, as shown in FIG. 20, an output C is derived when an input A is encrypted by an encrypting circuit 50 while using an input B as a key and then an output A is derived when an input C is decrypted by a decrypting circuit 51 while using the input B as the key. Also, the encrypted information obtained by encrypting X using a key Y is expresses as EX(Y).

As shown in FIG. 19, the key packaging system 7 includes a memory portion 6a and an LSI 70. The memory portion 6a stores therein a first encrypted key EDK(MK) obtained by encrypting a final key DK using an internal key MK, a second encrypted key EMK(CK) obtained by encrypting the internal key MK using a conversion key CK derived based on the conversion using the one-way function, and a third encrypted key EMKtst(CKtst) obtained by encrypting a testing internal key MKtst by using a testing conversion key CKtst as a key. The testing conversion key CKtst is converted by the one-way function that is equivalent to that used in generating the conversion key CK.

The LSI 70 has a first selector 64 that receives second and third inputs IN2, IN3 and then outputs selectively either input in response to a test signal TEST. A first decrypting circuit X 33 receives an output of this first selector 64 as an input. Also, a seed generating portion 71 consisting of a first constant storing portion 72, a second selector 73, a second constant storing circuit 74, and a second one-way function circuit B 75 is provided to the LSI 70.

The first constant storing portion 72 stores a first constant IDfuse serving as a source of a conversion seed IDfuse1, and a second constant IDtst serving as a source of a conversion seed for testing Idtst1. The first constant storing portion 72 is constructed such that any values can be packaged as the first constant IDfuse and the second constant IDtst by the fuse cutting by using the laser trimming, or the like.

The second selector 73 outputs selectively one of the first constant IDfuse and the second constant IDtst in response to the test signal TEST. The second constant storing circuit 74 stores a third constant Const therein. The second one-way function circuit B 75 converts the third constant Const serving as the conversion seed by the one-way function while using the output of the second selector 73.

The LSI 70 has a first one-way function circuit A 32 for converting the output of the second one-way function circuit B 75 serving as the conversion seed by the one-way function using the first input IN1 to generate the conversion key CK or the testing conversion key CKtst, the first decrypting circuit X 33 for decrypting the output of the first selector 64 by using the output of the first one-way function circuit A 32 as a key, and a second decrypting circuit Y 34 for decrypting the first input IN1 by using the output of the first decrypting circuit X 33 as a key.

A verifying circuit 65 for verifying the output of the second selector 73 is provided to the LSI 70. The verifying circuit 65 has a constant storing circuit 66 in which a constant CRCfuse equivalent to the result of the redundancy calculation of the constant IDfuse is fuse-packaged, and a comparator circuit 67 for executing the redundancy calculation of the output of the second selector 73 and then comparing the result with the constant CRCfuse stored in the constant storing circuit 66.

First, an operation of the LSI 70 at the testing time will be explained hereunder. In this case, the test signal TEST is set to "1". At this time, the first selector 64 receives "1" as the test signal TEST and then outputs selectively the input IN3, i.e., the third encrypted key EMKtst(CKtst). Also, the second selector 73 receives "1" as the test signal TEST and then outputs selectively the second constant IDtst stored in the first constant storing portion 72.

The second one-way function circuit B 75 converts the third constant Const stored in the second constant storing circuit 74 by the one-way function using the output of the second selector 73, i.e., the second constant IDtst. That is, the conversion seed for testing IDtst is output from the seed generating portion 71 as the conversion seed.

Then, the first one-way function circuit A 32 converts the conversion seed for testing IDtst1 output from the seed generating portion 71 by the one-way function that is equivalent to that used to generate the testing conversion key CKtst, while using the first input IN1, i.e., the first encrypted key EDK(MK). Accordingly, the testing conversion key CKtst is generated/output from the first one-way function circuit A 32.

The first decrypting circuit X 33 decrypts the output of the first selector 64, i.e., the third encrypted key EMKtst(CKtst) by using the output of the first one-way function circuit A 32, i.e., the testing conversion key CKtst as a key. Accordingly, the testing internal key MKtst is generated/output from the first decrypting circuit X 33. The second decrypting circuit Y 34 decrypts the first input IN1, i.e., the first encrypted key EDK(MK) by using the output of the first decrypting circuit X 33, i.e., the testing internal key MKtst as a key. Accordingly, the testing final key DKtst is generated from the second decrypting circuit Y 34.

Next, an operation of the LSI 70 at the normal time will be explained hereunder. In this case, the test signal TEST is set to "0". At this time, the first selector 64 receives "0" as the test signal TEST and then outputs selectively the input IN2, i.e., the second encrypted key EMK(CK). Also, the second selector 73 receives "0" as the test signal TEST and then outputs selectively the first constant IDfuse stored in the first constant storing portion 72.

The second one-way function circuit B 75 converts the third constant Const stored in the second constant storing circuit 74 by the one-way function using the output of the second selector 73, i.e., the first constant IDfuse. Accordingly, the conversion seed IDfuse1 is output from the seed generating portion 71.

Then, the first one-way function circuit A 32 converts the conversion seed IDfuse1 output from the seed generating portion 71 by the one-way function that is equivalent to that used to generate the conversion key CK, while using the first encrypted key EDK(MK). Accordingly, the conversion key CK is generated/output from the first one-way function circuit A 32.

The first decrypting circuit X 33 decrypts the output of the first selector 64, i.e., the second encrypted key EMK(CK) by using the output of the first one-way function circuit A 32, i.e., the conversion key CK as a key. Accordingly, the internal key MK is generated/output from the first decrypting circuit X 33. The second decrypting circuit Y 34 decrypts the first input IN1, i.e., the first encrypted key EDK(MK) by using the output of the first decrypting circuit X 33, i.e., the internal key MK as a key. Accordingly, the final key DK is generated from the second decrypting circuit Y 34.

At this time, the output of the second selector 73 is also input into the comparator circuit 67 in the verifying circuit 65. The comparator circuit 67 checks whether or not the result of the redundancy calculation of the output of the second selector 73 coincides with the constant CRCfuse that is fuse-packaged in the constant storing circuit 66. Accordingly, it is possible to verify the validity of the second constant IDfuse stored in the seed generating portion 71.

In the above key packaging system in the prior art, there exists the circumstance that it is unfeasible to specify the maker who manufactured the terminal device, the system LSI, or the memory portion by the illegally flown-out device, the system LSI, or the memory portion. Also, in the case where particular security information were run out, a great deal of terminal devices or system LSIs that are able to operate normally can be manufactured by copying such particular security information. Thus, there exists the circumstance that it is unfeasible to protect the copyright completely.

SUMMARY OF THE INVENTION

It is an object of the present invention to provide a security information packaging system, an LSI, a memory portion, and a security information packaging method, capable of achieving the strict management of the security information by making it possible to specify the maker who manufactured the terminal device, the system LSI, or the memory portion, and so forth based on the illegally flown-out device, the system LSI, or the memory portion.

A security information packaging system of the present invention comprises a storing portion for storing first encrypted security information obtained by encrypting final security information by using internal security information and second encrypted security information obtained by encrypting the internal security information by using converted security information; and an LSI including a seed generating portion for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal, a first one-way function circuit for converting the conversion seed and the conversion seed for testing output from the seed generating portion by the first encrypted security information input from the storing portion to generate the converted security information or the converted security information for testing, a first decrypting circuit for decrypting the second encrypted security information input from the storing portion by using an output of the first one-way function circuit as a key, and a second decrypting circuit for decrypting the first encrypted security information input from the storing portion by using an output of the first decrypting circuit as a key.

An LSI of the present invention into which first encrypted security information obtained by encrypting final security information by using internal security information and second encrypted security information obtained by encrypting the internal security information by using converted security information are input, comprises a seed generating portion for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal; a first one-way function circuit for converting the conversion seed and the conversion seed for testing output from the seed generating portion by the first encrypted security information to generate the converted security information or the converted security information for testing; a first decrypting circuit for decrypting the second encrypted security information by using an output of the first one-way function circuit as a key; and a second decrypting circuit for decrypting the first encrypted security information by using an output of the first decrypting circuit as a key.

A storing device of the present invention for supplying first encrypted security information and second encrypted security information to an LSI, the LSI including a seed generating portion for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal, a first one-way function circuit for converting the conversion seed and the conversion seed for testing output from the seed generating portion by the first encrypted security information to generate the converted security information or the converted security information for testing, a first decrypting circuit for decrypting the second encrypted security information by using an output of the first one-way function circuit as a key, and a second decrypting circuit for decrypting the first encrypted security information by using an output of the first decrypting circuit as a key, and wherein the first encrypted security information is obtained by encrypting final security information by using internal security information, and the second encrypted security information is obtained by encrypting the internal security information by using the converted security information.

A security information packaging method of the present invention of packaging security information into a system having a storing portion and an LSI, comprises a process of storing first encrypted security information obtained by encrypting final security information by using internal security information and second encrypted security information obtained by encrypting the internal security information by using converted security information into the storing portion; and a process of packaging the LSI, which includes a seed generating portion for storing a first constant containing address information and serving as a generation source of a conversion seed, a second constant serving as a generation source of a conversion seed for testing, and a third constant and then outputting the conversion seed and the conversion seed for testing obtained by converting the third constant based on a one-way function using the first constant or the second constant in response to a test signal, a first one-way function circuit for converting the conversion seed and the conversion seed for testing output from the seed generating portion by the first encrypted security information to generate the converted security information or the converted security information for testing, a first decrypting circuit for decrypting the second encrypted security information by using an output of the first one-way function circuit as a key, and a second decrypting circuit for decrypting the first encrypted security information by using an output of the first decrypting circuit as a key, into the system.

According to the present invention, the maker who manufactured the terminal device, the system LSI, or the memory portion can be specified by the illegally flown-out device, the system LSI, or the memory portion by correlating the encrypted security information with the address information, and also the strict management of the security information can be achieved.

DESCRIPTION OF THE PREFERRED EMBODIMENTS

Embodiments of the present invention will be explained with reference to the drawings hereinafter. First, the license management, i.e., license scheme required to give the manufacturer a license of security information in stages in which security information packaging systems of embodiments of the present invention are developed, manufactured, inspected and packaged respectively will be explained hereunder. In this case, all information such as keys, parameters, encryption algorithm or conversion table, and so on, which should be kept secret, are contained in the security information.

Figure 1:
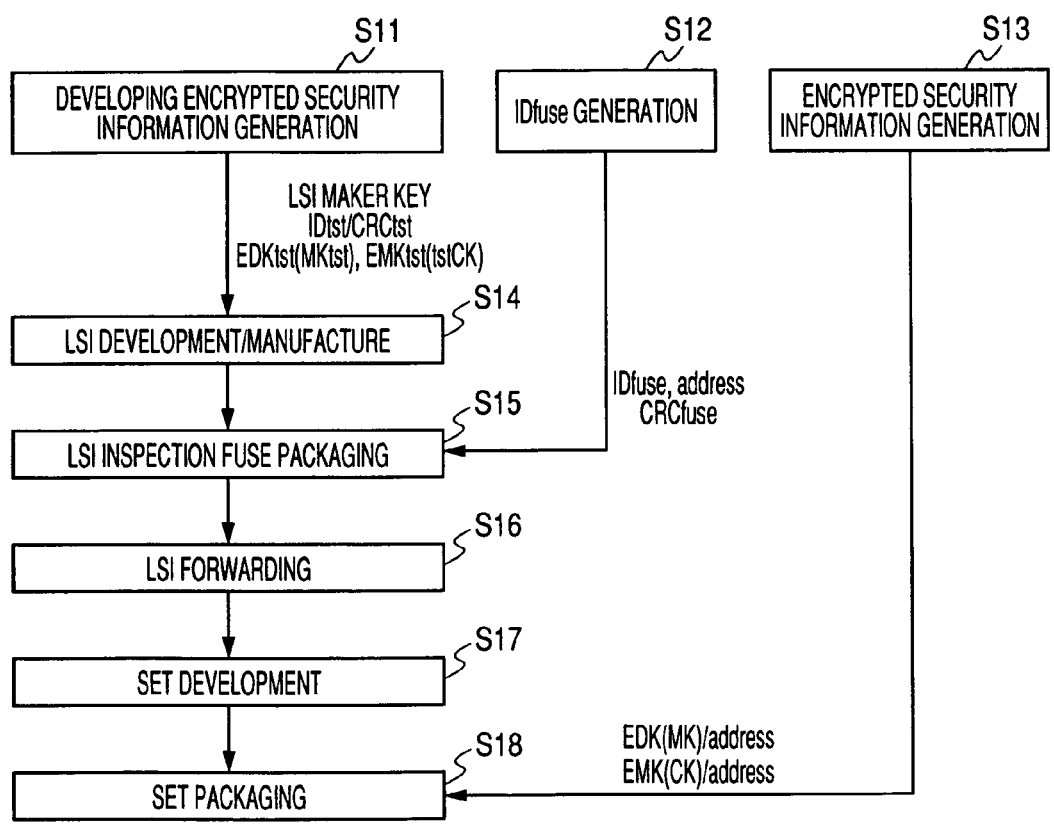
FIG. 1 is a flowchart explaining the overall processes required until a security information packaging system of a present embodiment is packaged into the terminal device.
Figure 2:
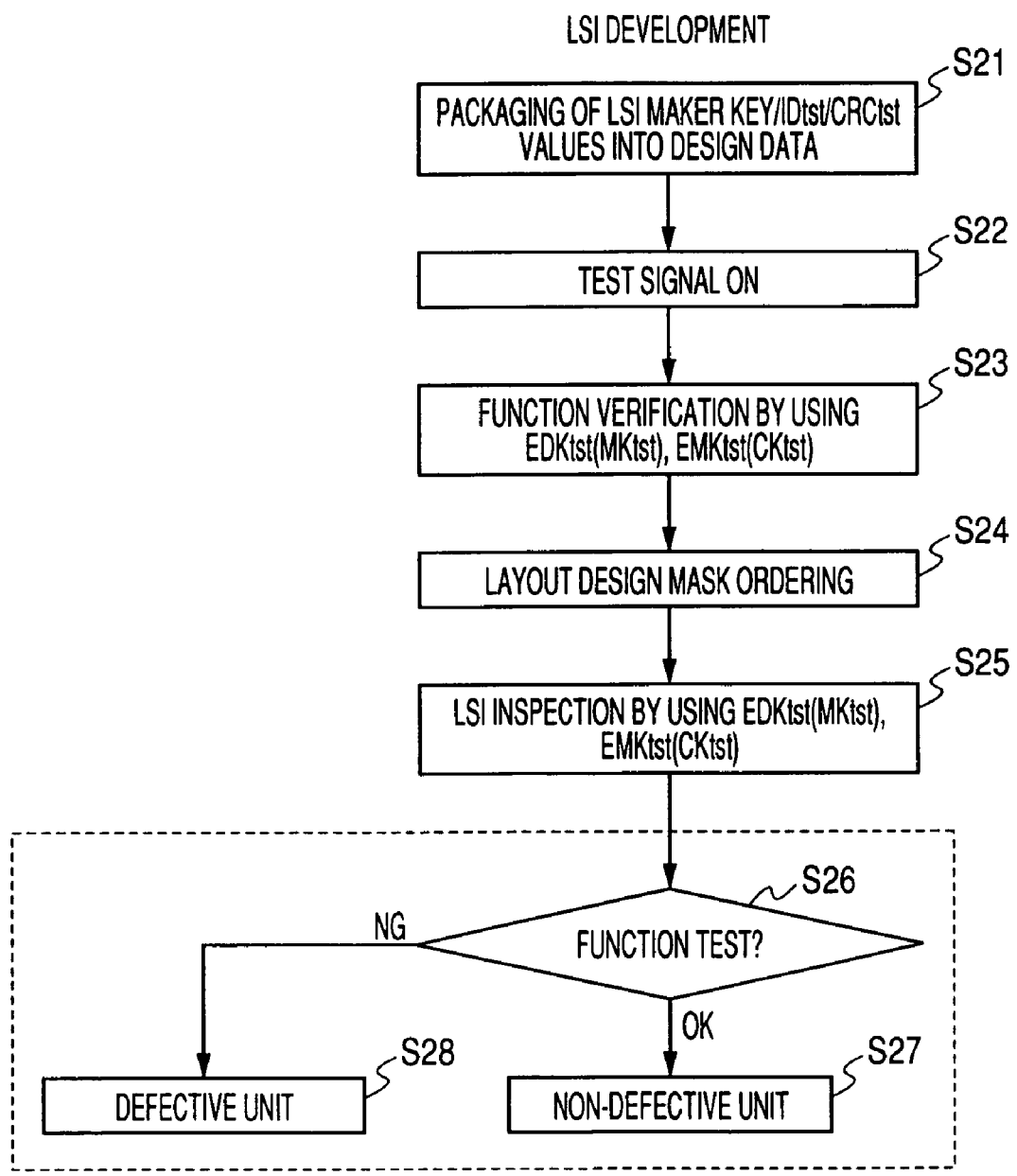
FIG. 2 is a flowchart explaining the developing process of a system LSI built in the security information packaging system of the present embodiment.
Figure 3:
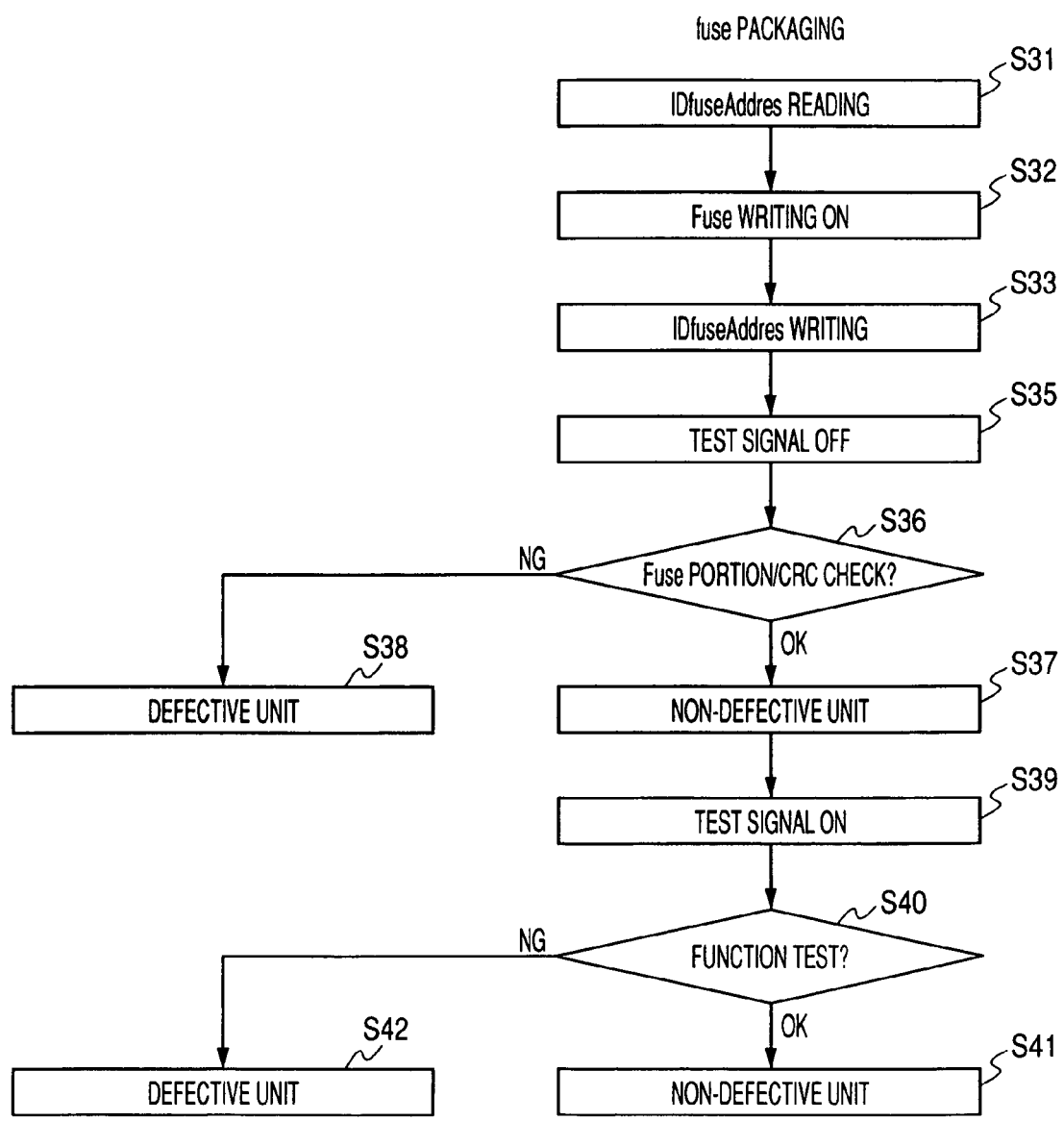
FIG. 3 is a flowchart explaining the fuse packaging process of the security information packaging system of the present embodiment.
Figure 4:
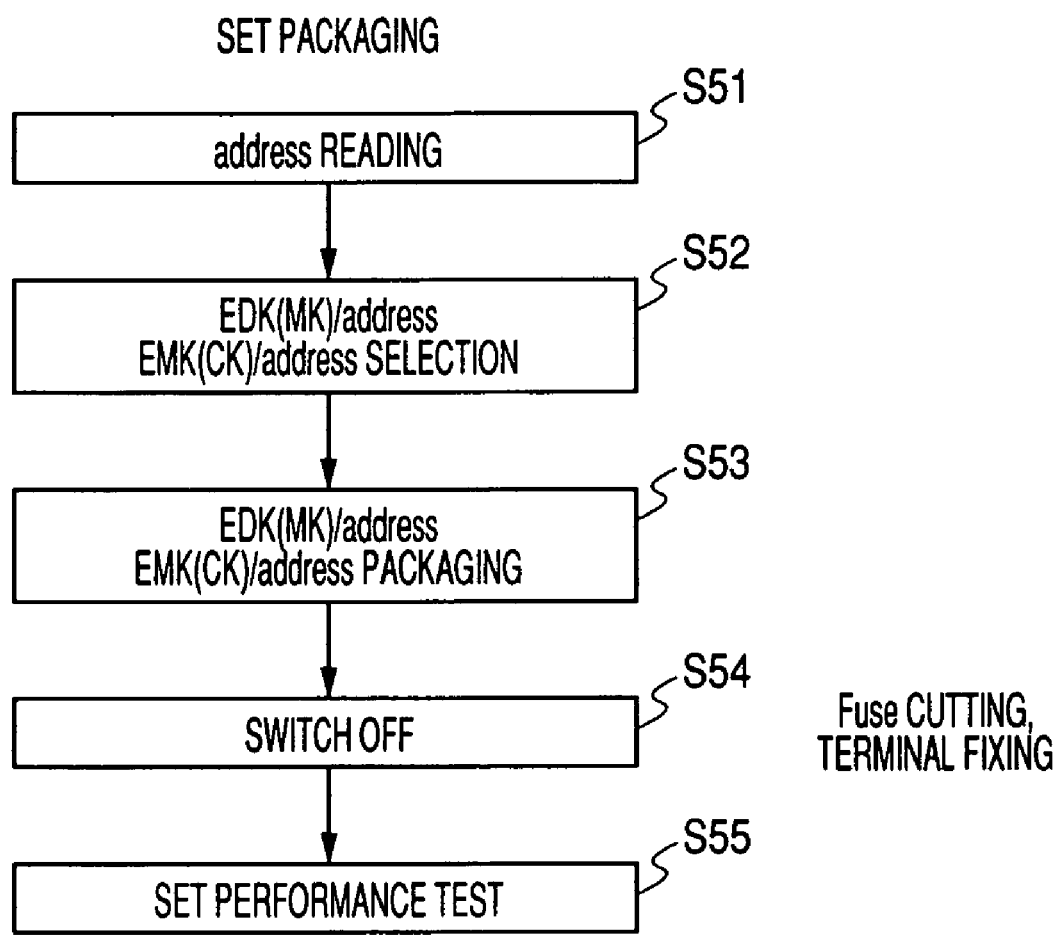
FIG. 4 is a flowchart explaining the set packaging process into the terminal device, or the like in which the security information packaging system of the present embodiment is built.

FIG. 1 is a flowchart explaining the overall processes required until the security information packaging system of the present embodiment is packaged into the terminal device. FIG. 2, FIG. 3 and FIG. 4 are a flowchart explaining the developing process, the fuse packaging process, and the set packaging process of the system LSI that is built in the security information packaging system of the present embodiment respectively.

Figure 5:
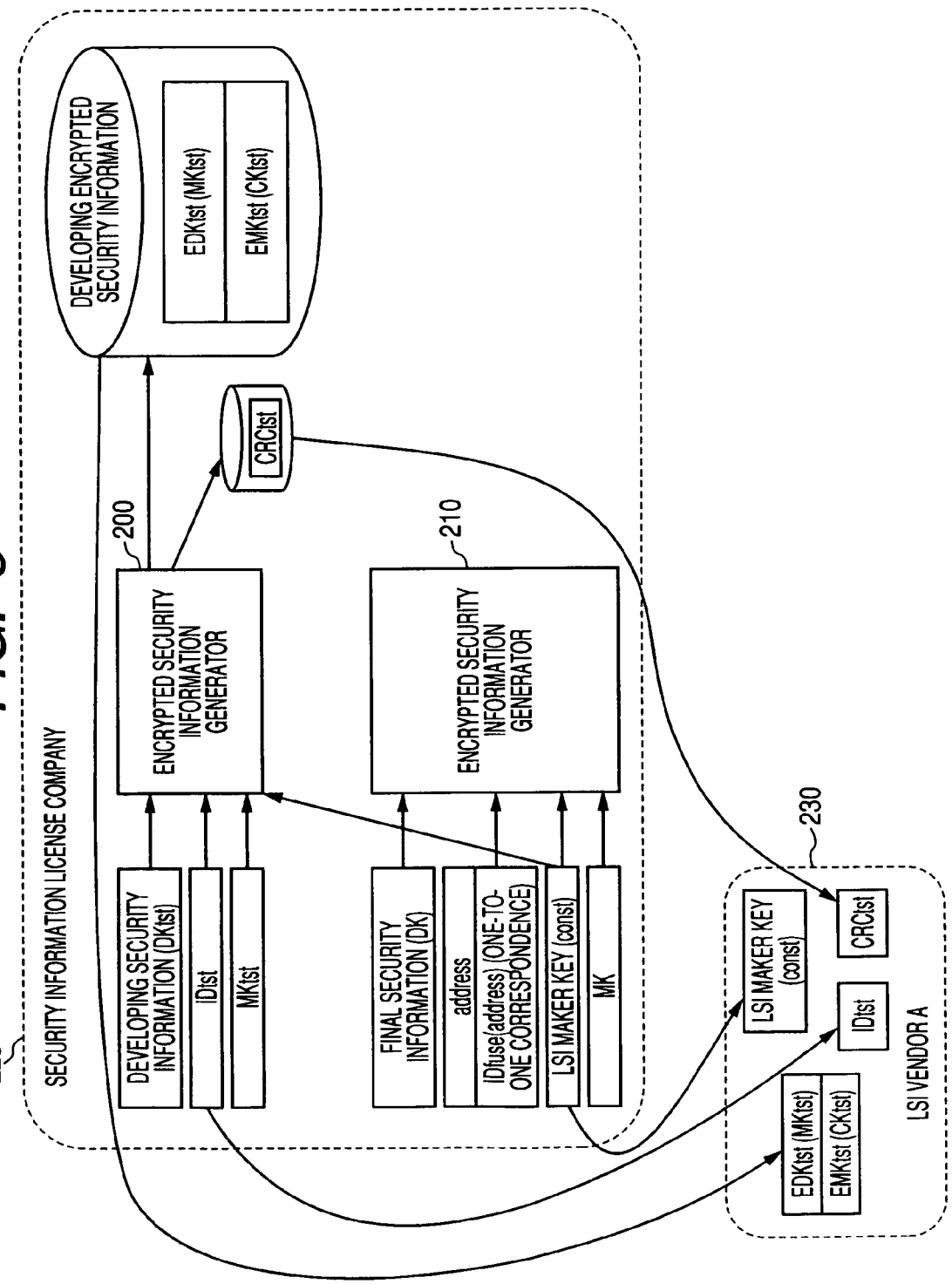
FIG. 5 is a view explaining a license scheme applied in the case where a license is given from a security information license company 220 to an LSI vendor A 230 that is in charge of development and manufacture of the system LSI.

FIG. 5 is a view explaining a license scheme applied in the case where a license is given from a security information license company 220 to an LSI vendor A 230 that is in charge of development and manufacture of the system LSI, the development process of the system LSI built in the security information packaging system of the present embodiment.

Figure 6:
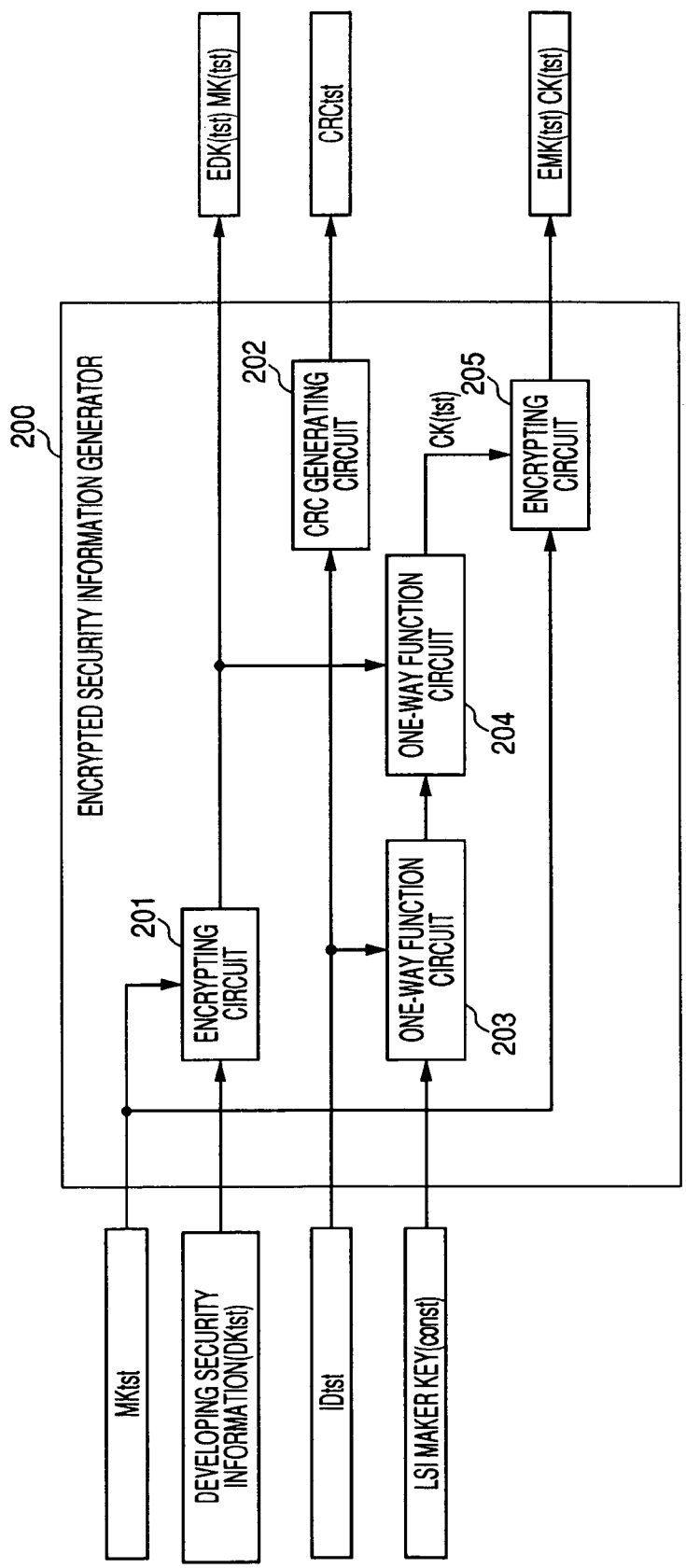
FIG. 6 is a block diagram explaining an encrypted security information generator 200 to generate the encrypted security information.
Figure 7:
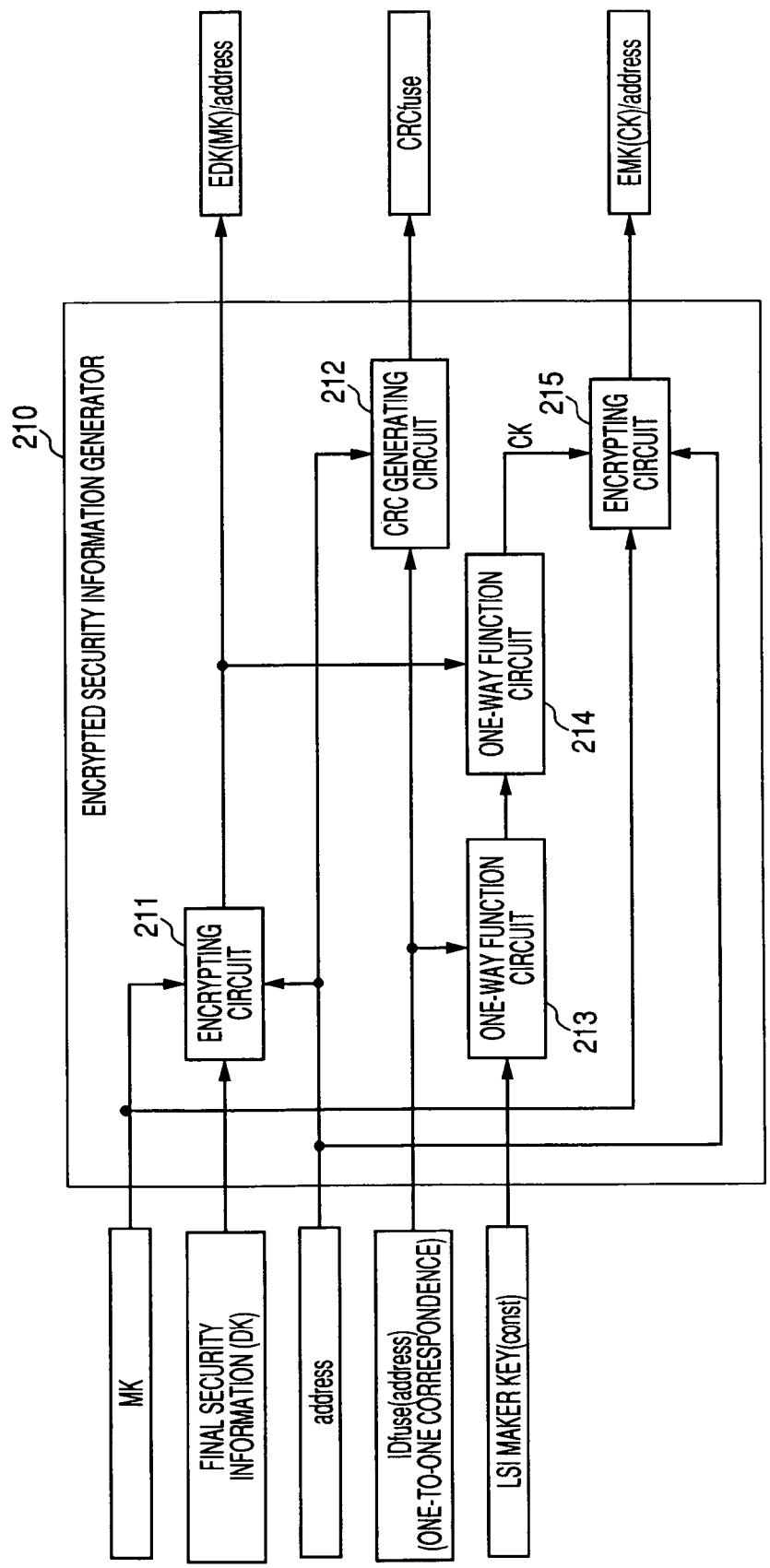
FIG. 7 is a block diagram explaining an encrypted security information generator 210 to generate the encrypted security information.

FIG. 6 and FIG. 7 are block diagrams explaining encrypted security information generators 200, 210 to generate the encrypted security information in the security information license company 220 shown in FIG. 5.

Figure 8:
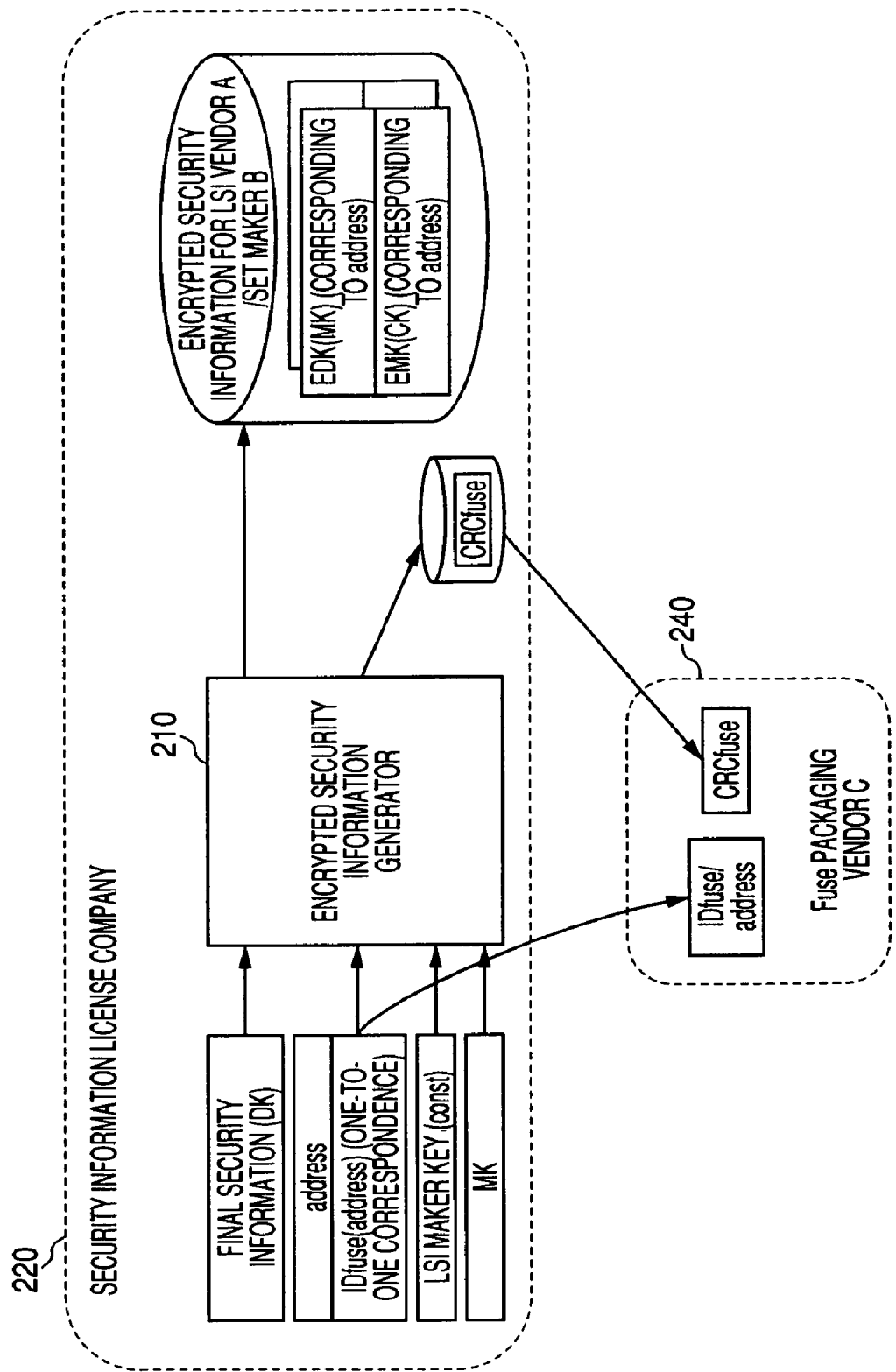
FIG. 8 is a view explaining a license scheme applied in the case where a license is given from the security information license company 220 to a Fuse packaging vendor C 240 that is in charge of fuse packaging of the system LSI.

FIG. 8 is a view explaining a license scheme applied in the case where the license is given from the security information license company 220 to a Fuse packaging vendor C 240 that is in charge of fuse packaging of the system LSI, in the fuse packaging process of the system LSI built in the security information packaging system of the present embodiment.

Figure 9:
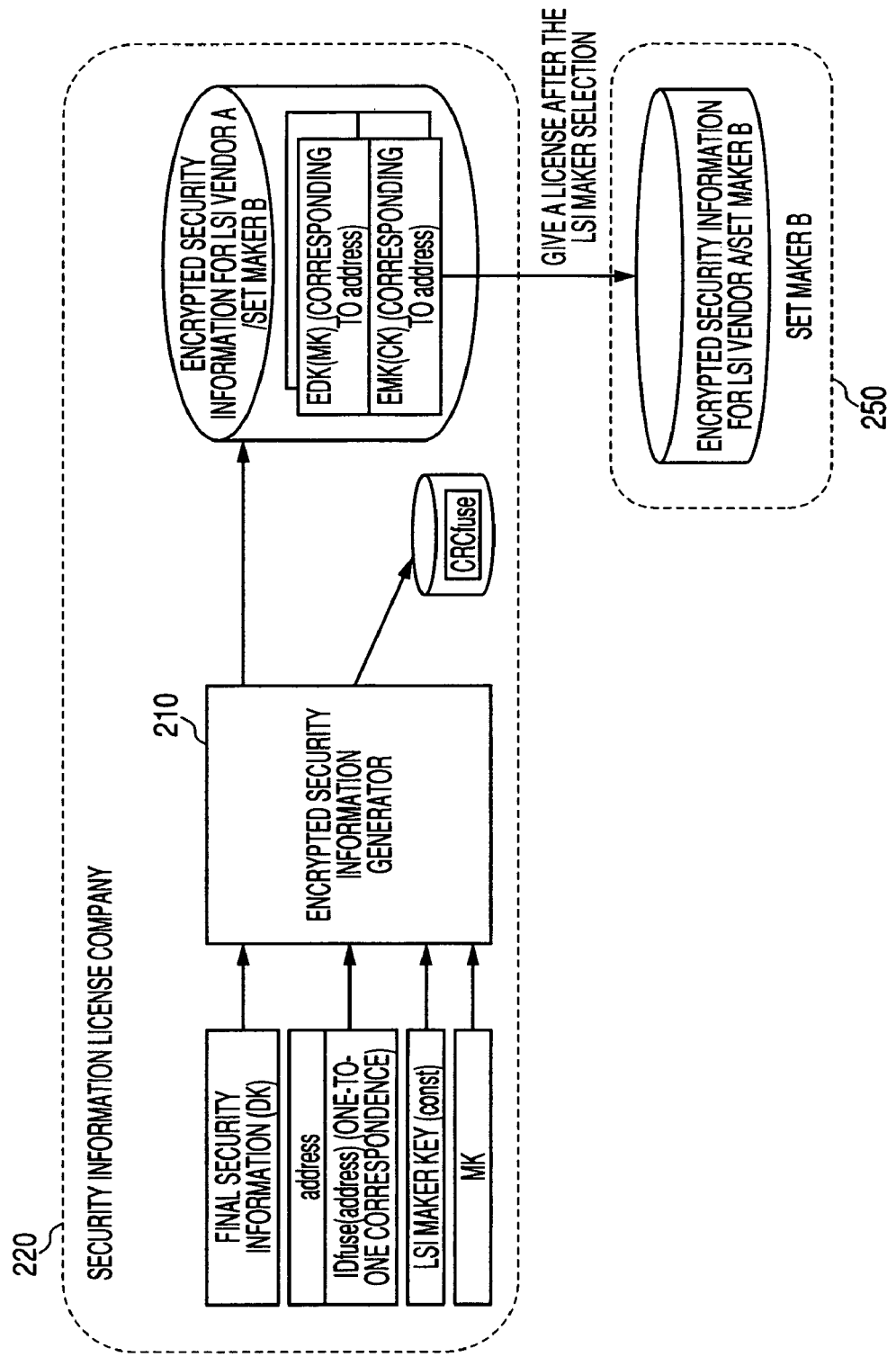
FIG. 9 is a view explaining a license scheme applied in the case where a license is given from the security information license company 220 to a set maker B 250 that is in charge of set packaging of the system LSI.
Figure 10:
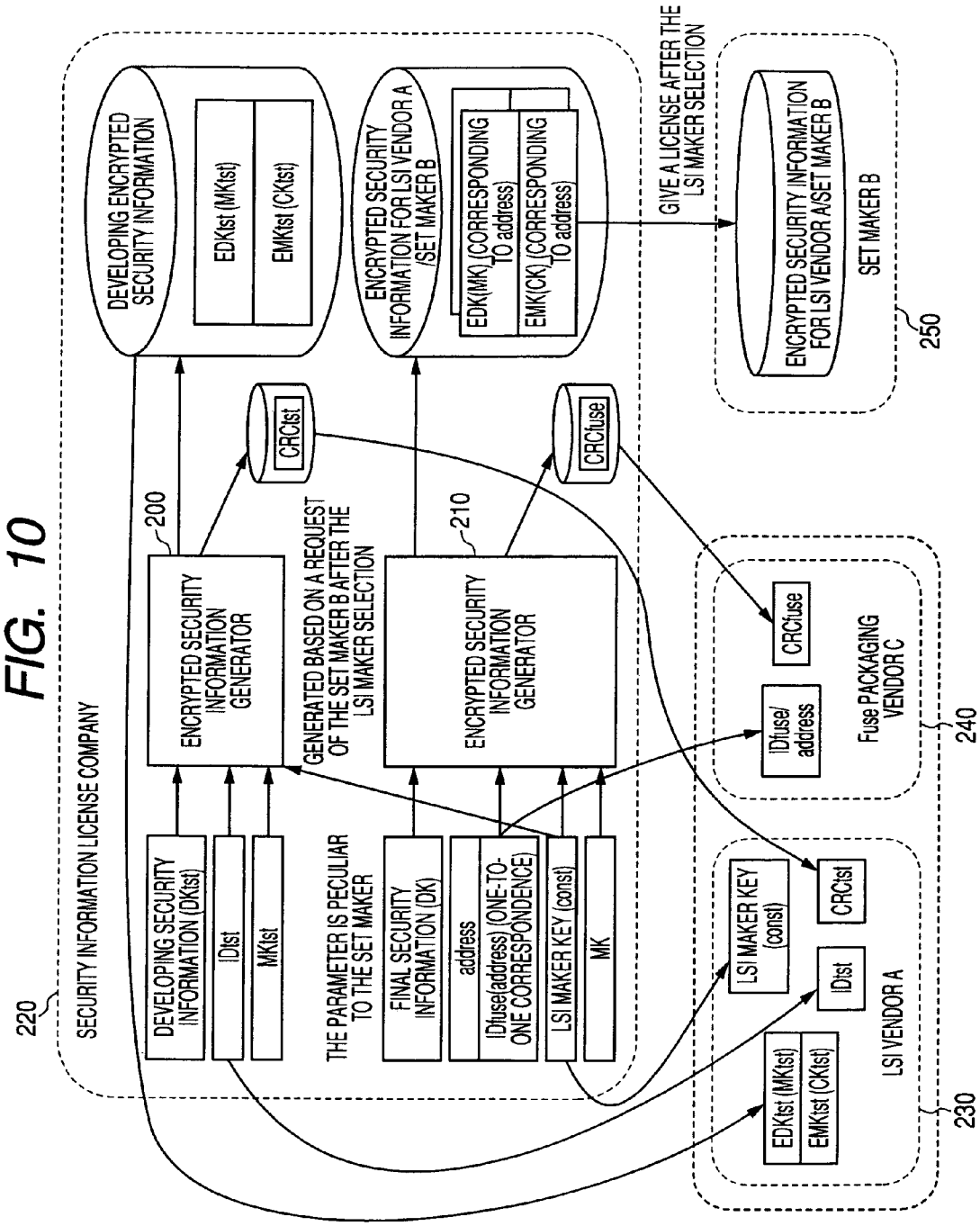
FIG. 10 is a view explaining a license scheme of the overall process to package the security information packaging system of the present embodiment into the terminal device.

FIG. 9 is a view explaining a license scheme applied in the case where the license is given from the security information license company 220 to a set maker B 250 that is in charge of set packaging of the system LSI, in the set packaging process of the system LSI built in the security information packaging system of the present embodiment. FIG. 10 is a view explaining a license scheme of the overall processes applied to package the security information packaging system of the present embodiment into the terminal device, while integrating FIG. 5, FIG. 8 and FIG. 9.

Next, the license scheme applied in respective stages to develop, manufacture, inspect and package the security information packaging system of the embodiment of the present invention will be explained in seriatim hereunder. The subject who sales the terminal device in which the security information packaging system of the present embodiment is built and also manages the copyright of the contents played, etc. in the terminal device is the security information license company 220.

First, as shown in FIG. 1 and FIG. 5, the security information license company 220 generates Encrypted security information for LSI developing to give the LSI vendor A 230 an LSI developing license (step S11 in FIG. 1). As shown in FIG. 6, the security information license company 220 generates the encrypted security information that is offered to the LSI vendor A 230, by the encrypted security information generator 200. In other words, an encrypting circuit 201 encrypts security information DKtst for developing by using internal security information MKst for testing as a key to generate first encypted security information EDKtst(MKtst) for developing.

Then, a one-way function circuit 203 converts a LSI maker key Const by the one-way function using a constant IDtst for testing as a key. Then, a one-way function circuit 204 converts the converted result by the one-way function using the first encrypted security information EDKtst(MKtst) for developing generated by the first encrypted security information EDKtst(MKtst) for developing as a key to generate a testing conversion key CKtst.

Then, an encrypting circuit 205 encrypts the internal security information MKst for testing by using the testing conversion key CKtst output from the one-way function circuit 204 as a key to generate a second developing encrypted security information EMKtst(CKtst) for developing. Also, a CRC generating circuit 202 executes the redundancy calculation (e.g., CRC 16) of the constant IDtst for testing to generate a constant CRCtst for verifying-testing.

Then, as shown in FIG. 5, the security information license company 220 gives the first and second encrypted security information EDKtst(MKtst) for developing, EMKtst(CKtst), the constant IDtst for testing, the constant CRCtst for verifying-testing, and the LSI maker key Const to the LSI vendor A 230.

The LSI maker key Const has a configuration of (XXXX)+ (LSI maker specifying bit), for example, and has bits by which the maker who manufactured the LSI can be specified. In this manner, since only the encrypted security information for testing is offered to the LSI vendor A 230, the essential concealability of the encrypted security information can be improved. Also, since the bits that make it possible to specify the maker who manufactured the LSI are contained in the LSI maker key Const, the management can be tighten even though the encrypted security information for testing was run out.

Then, the LSI vendor A 230, when receives the offer of the developing encrypted security information, develops and manufactures the LSI based on the developing encrypted security information (step S14 in FIG. 1).

FIG. 2 is a flowchart explaining the developing and manufacturing processes of the system LSI carried out in the LSI vendor A 230. As shown in FIG. 2, the LSI vendor A 230 packages values of the LSI maker key Const, the constant IDtst for testing, and the constant CRCtst for verifying-testing values into the design data (step S21), and then turns ON the test signal used for the LSI inspection described later (step S22).

Then, LSI functions are verified by using the first and second encypted security information EDKtst(MKtst) for developing, EMKtst(CKtst) (step S23), and then the layout design and the mask ordering are carried out (step S24).

Then, the LSI test is carried out by using the first and second encypted security information EDKtst(MKtst) for developing, EMKtst(CKtst) (step S25). Then, the function test is carried out (step S26), and then the LSI is classified into the non-defective unit (step S27) if OK in step S26 and also the LSI is classified into the defective unit (step S28) if NG in step S26.

Then, the security information license company 220 generates the encrypted security information such as IDfuse, etc. offered to the fuse packaging vendor C 240 (step S12 in FIG. 1), and also generates the encrypted security information such as the first encrypted security information EDK(MK)/address, etc. offered to the set maker B 250 (step S13 in FIG. 1).

In this case, as shown in FIG. 7 and FIG. 8, the security information license company 220 causes the encrypted security information generator 210 to generate the encrypted security information. In other words, an encrypting circuit 211 encrypts the final security information DK by using the internal security information MK and the address as keys, and generates the first encrypted security information EDK(MK)/ address that is correlated with the address.

Then, a one-way function circuit 213 converts the LSI maker key Const by the one-way function using the constant IDfuse/address corresponding to the address as a key. Then, a one-way function circuit 214 converts the converted result by the one-way function using the first encrypted security information EDK(MK)/address generated by the encrypting circuit 211 as a key to generate the conversion key CK.

Then, an encrypting circuit 215 encrypts the internal security information MK by using the conversion security information CK and the address generated by the one-way function circuit 214 as a key and generates the second encrypted security information EMK(CK)/address. Also, a CRC generating circuit 212 executes the redundancy calculation (e.g., CRC 16) of the constant IDfuse/address corresponding to the address and generates the constant CRCfuse for verifying.

Then, as shown in FIG. 8, the security information license company 220 gives the constant IDfuse/address and the constant CRCfuse for verifying to the fuse packaging vendor C 240. The fuse packaging vendor C 240, when receives the offer of the encrypted security information for packaging, executes the LSI inspection and the fuse packaging based on the encrypted security information for packaging (step S15 in FIG. 1).

FIG. 3 is a flowchart explaining the fuse packaging process executed in the fuse packaging vendor C 240. The fuse packaging vendor C 240 reads the constant IDfuse/address offered from the security information license company 220 (step S31), and then turns ON a fuse writing equipment (step S32).

Then, the constant IDfuse/address is loaded in the LSI (step S33). Then, the test signal is turned OFF (step S35). Then, the Fuse portion/CRC check is carried out (step S36).

Then, as the result of the CRC check, if the constant IDfuse/address is normally loaded (OK), the LSI is classified into the non-defective unit (step S37). In contrast, if constant IDfuse/address is not normally loaded (NG), the LSI is classified into the defective unit (step S38).

Then, the test signal is turned ON with respect to the non-defective unit (step S39). Then, function tests of the encrypting circuit, the one-way function circuit, etc. provided to the LSI are executed respectively (step S40). If the function tests are normal (OK), the LSI is classified into the non-defective unit (step S41) while, if the function tests are not normal (NG), the LSI is classified into the defective unit (step S42).

The LSI whose function tests are normal and which is classified into the non-defective unit in the fuse packaging vendor C 240 is forwarded to the set maker B 250 (step S16 in FIG. 1). Then, the set development is executed in the set maker B 250 (step S17 in FIG. 1).

On the contrary, in the security information license company 220, as described above, the first encrypted security information EDK(MK)/address and the second encrypted security information EMK(CK)/address are generated by the encrypted security information generator 210. Then, these encrypted security information are offered to the set maker B 250 (see FIG. 9).

In the set maker B 250 that receives the offer of the encrypted security information, the LSI is packaged in the set (step S18 in FIG. 1). The LSI packaging process executed in the set maker B 250 is shown in a flowchart in FIG. 4.

In other words, the set maker B 250 reads the Address that has a correlation with the encrypted security information (step S51), and then selects the first encrypted security information EDK(MK)/address and the second encrypted security information EMK(CK)/address in accordance with the Address value (step S52).

Then, the set maker B packages the first encrypted security information EDK(MK)/address and the second encrypted security information EMK(CK)/address selected in the set (step S53). Then, the switch provided to the LSI (described later) is turned OFF by executing the fuse cutting or the terminal fixing (step S54). Then, the final performance test of the set is executed (step S55).

Now, the internal security information MK and the final security information DK have a configuration of (YYYY)+(set maker specifying bits), for example, and have the bits by which the set maker who packages the LSI into the set can be specified. In this case, as the internal security information MK and the final security information DK, a different value may be employed every IDfuse. In this manner, since the constant IDfuse/address is the ID that is correlated with the address and is peculiar to the LSI, the set maker cannot apply the same security information to some other purpose. Also, since the bit that permits the user to specify the set maker who manufactured the LSI are contained in the internal security information MK and the final security information DK, the management can be tightened even though the internal security information MK and the final security information DK are flown out.

Embodiment 1

Next, a circuit and an operation of the security information packaging system of the present embodiment will be explained every processing stage hereunder.

Figure 11:
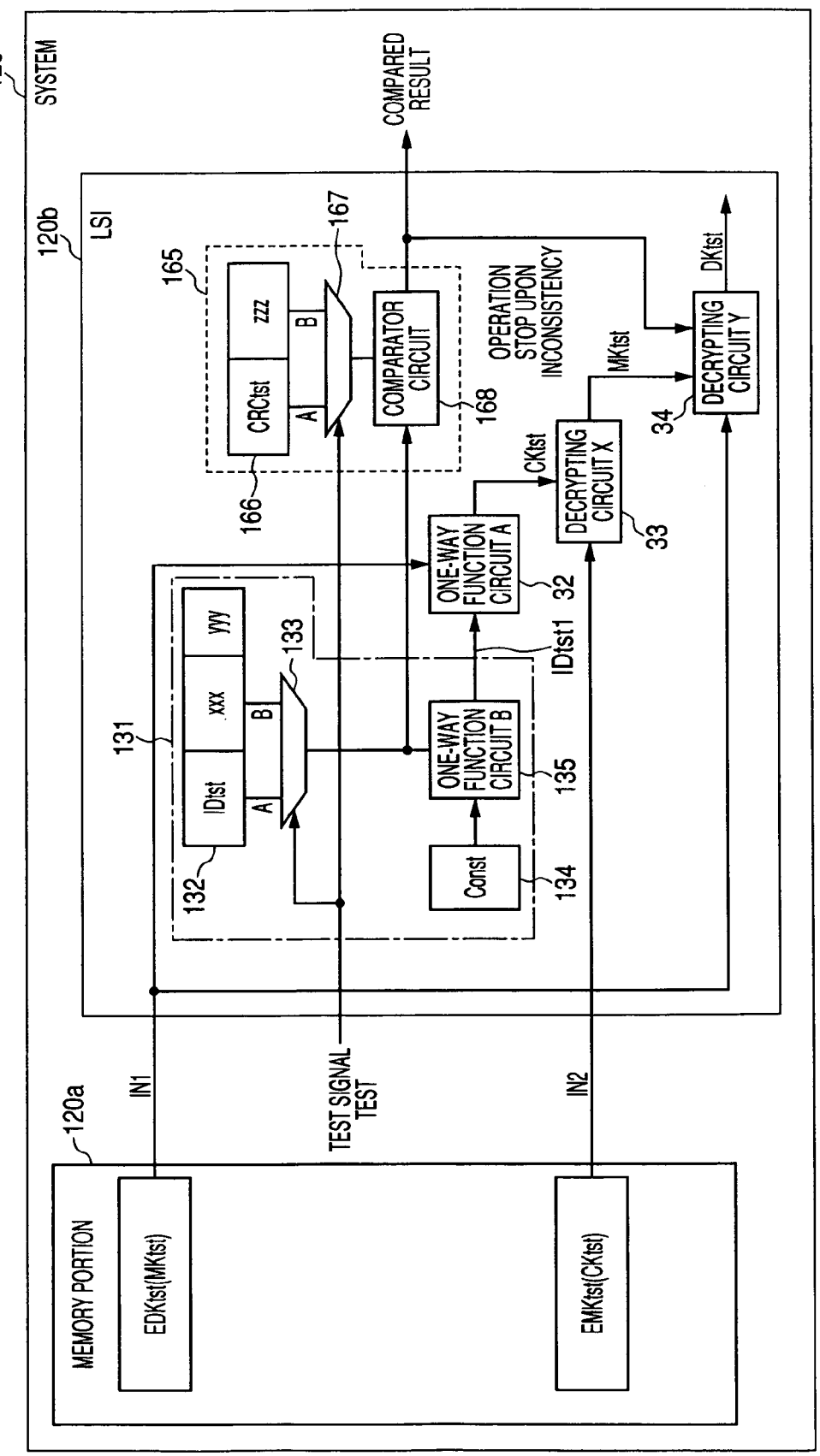
FIG. 11 is a circuit diagram explaining a schematic configuration of a security information packaging system 120 of the present embodiment in the LSI developing stage.

FIG. 11 is a circuit diagram explaining a schematic configuration of a security information packaging system 120 of the present embodiment in the LSI developing stage. Since nothing is loaded into the fuse and address described in detail later in the LSI developing stage in the LSI vendor A 230, the test is carried out by using the test value. As shown in FIG. 11 the security information packaging system 120 includes a memory portion 120a and an LSI 120b.

The memory portion 120a stores therein the first encrypted security information for testing EDKtst(MKtst) obtained by encrypting the testing final security information DKtst by using the internal security information MKst for testing, and the second encrypted security information for testing EMKtst (CKtst) obtained by encrypting the internal security information MKst for testing by using the converted security information for testing CKtst derived by the conversion using the one-way function. The converted security information for testing CKtst is converted by the one-way function that is equivalent to that used to generate the converted security information CK. A first seed generating portion 131 consisting of a first constant storing circuit 132, a first selector 133, a second constant storing circuit 134, and a second one-way function circuit B 135 is provided to the LSI 120b.

The first constant storing circuit 132 stores the second constant IDtst serving as a source of the conversion seed for testing IDtst therein. In this case, an area into which the first constant IDfuse serving as the conversion seed IDfuse1 and the address are loaded in the fuse packaging stage after the development of LSI has been completed is provided in the first constant storing circuit 132. Since the data in this area are not used in the LSI developing stage, "xxx", "yyy" are stored as the first constant in FIG. 11. But any values may be employed if they are not used in the product. The first constant storing circuit 132 is constructed in such a manner that the second constant IDtst, the first constant IDfuse, and the address can be packaged by the laser trimming, the electric fuse, or the fuse cutting by other nonvolatile memory, etc. or loading the constant from the external device.

The first selector 133 outputs selectively one of the first and second constants "xxx", "yyy" and IDtst in response to the test signal TEST The second constant storing circuit 134 stores the third constant Const as the LSI maker key therein. The second one-way function circuit B 135 converts the third constant Const as the conversion seed by the one-way function using the output of the first selector 133.

The LSI 120b has the first one-way function circuit A 32 that converts the output of the second one-way function circuit B 135 serving as the conversion seed by the one-way function using the first input IN1, i.e., the first encrypted security information for testing EDKtst(MKtst) to generate the converted security information for testing CKtst, the first decrypting circuit X 33 that decrypts the second input IN2, i.e., the second encrypted security information for testing EMKtst(CKtst) by using the output of the first one-way function circuit A 32 as a key, and the second decrypting circuit Y 34 that decrypts the first input IN1 by using the output of the first decrypting circuit X 33 as a key.

In addition, a verifying circuit 165 for verifying the output of the first selector 133 is provided to the LSI 120*b*. The verifying circuit 165 has a third constant storing circuit 166 for storing the constant CRCtst equivalent to the result of the redundancy calculation of the constant IDtst for testing and a comparator circuit 168 for applying the above redundancy calculation to the output of the first selector 133 and then comparing the result with the constant CRCtst stored in the third constant storing circuit 166.

In the LSI developing stage, the data corresponding to the first constant IDfuse and the address are not loaded into the third constant storing circuit 166 because the first constant IDfuse and the address used in the fuse packaging stage or the external constant loading stage are not loaded in the first constant storing circuit 132. Therefore, such data are indicated by zzz in FIG. 11. Like xxx and yyy, any value may be employed as zzz if such value is not used in the product.

Next, an operation of the LSI 120*b* in the inspection will be explained hereunder. In this case, the test signal TEST is set to "1". At this time, the first selector 133 receives "1" as the test signal TEST and output selectively the second constant IDtst for testing stored in the first constant storing circuit 132.

The second one-way function circuit B 135 converts the third constant Const as the LSI maker key stored in the second constant storing circuit 134 by the one-way function using the output of the first selector 133, i.e., the second constant IDtst for testing. That is, the conversion seed for testing IDtst is output from the seed generating portion 131 as the conversion seed.

Then, the first one-way function circuit A 32 converts the conversion seed for testing IDtst output from the seed generating portion 131 by the one-way function corresponding to that used to generate the converted security information for testing CKtst, while using the first input IN1, i.e., the first encrypted security information for testing EDKtst(MKtst). Accordingly, the converted security information for testing CKtst is generated/output from the first one-way function circuit A 32.

The first decrypting circuit X 33 decrypts the second input IN2, i.e., the second encrypted security information for testing EMKtst(CKtst) by using the output of the first one-way function circuit A 32, i.e., the converted security information for testing CKtst as a key. Accordingly, the internal security information MKst for testing is generated/output from the first decrypting circuit X 33.

The second decrypting circuit Y 34 decrypts the first input IN1, i.e., the first encrypted security information for testing EDKtst(MKtst) by using the output of the first decrypting circuit X 33, i.e., the internal security information MKst for testing as a key. Accordingly, the testing final security information DKtst is generated from the second decrypting circuit Y 34.

Meanwhile, a second selector 167 in the verifying circuit 165 receives "1" as the test signal TEST and then outputs selectively the testing verification constant CRCtst stored in the third constant storing circuit 166.

At this time, the output of the first selector 133 is input into the comparator circuit 168 in the verifying circuit 165. The comparator circuit 168 checks whether or not the result of the redundancy calculation of the output of the first selector 133 is identical to CRCtst that is the output of the second selector 167 and stored in the third constant storing circuit 166. Then, if the comparator circuit 168 senses the inconsistency, an operation of the second decrypting circuit Y 34 is stopped. Accordingly, the validity of the second constant IDtst for testing stored in the seed generating portion 131 can be verified. Also, since testing is executed by using the dummy parameter in the LSI developing stage and thus the LSI developer cannot acquire the encrypted security information (parameter), the concealability of the encrypted security information can be improved. In addition, since the normal product is not operated by the test value, the copyright of the contents can be protected even though the encrypted security information are illegally flown out. In this case, the test signal TEST is set to "0" in the normal operation of the LSI 120*b*, but the normal operation is not carried out in the LSI developing stage and therefore their explanation will be omitted herein.

Figure 12:
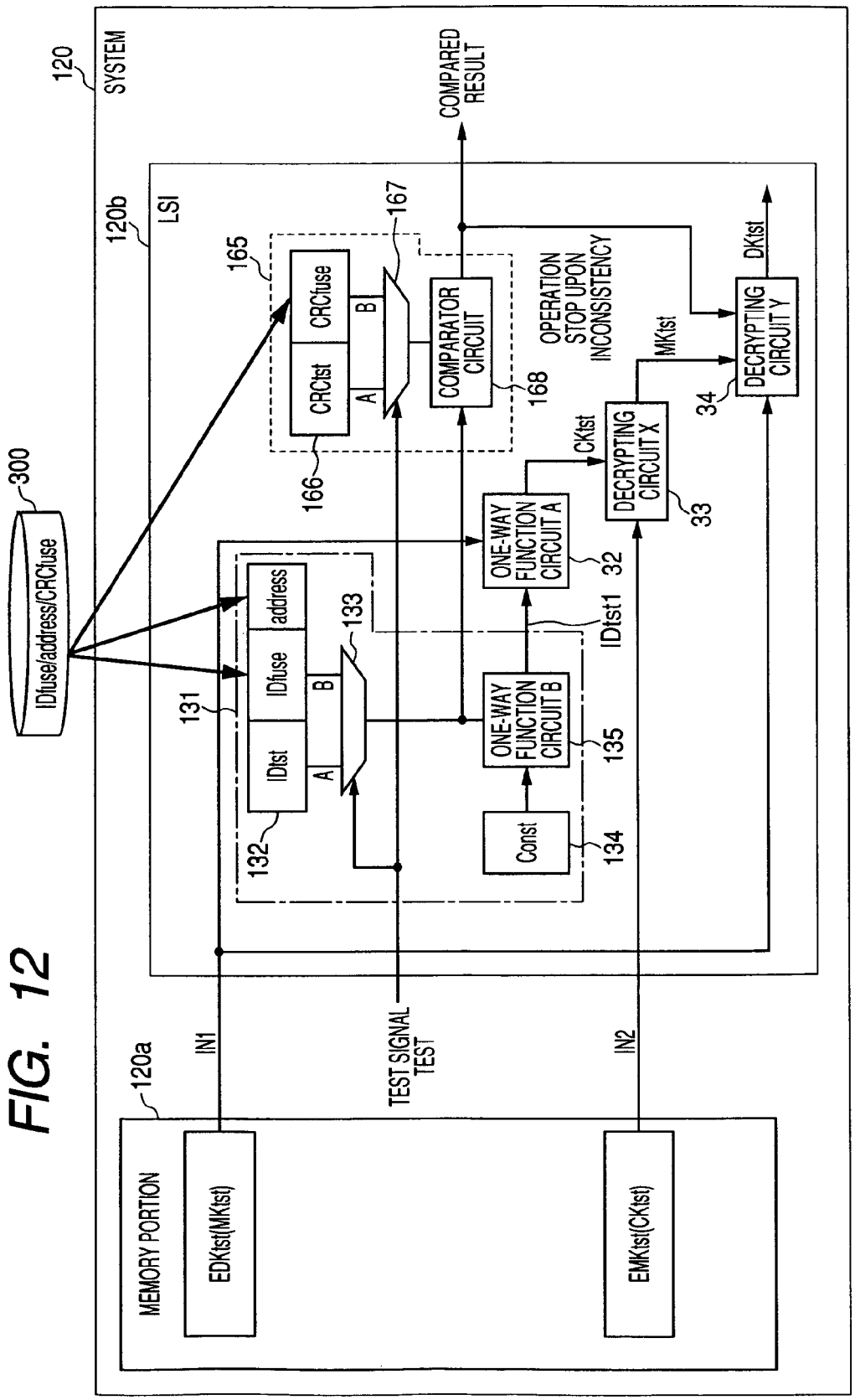
FIG. 12 is a circuit diagram explaining a schematic configuration of the security information packaging system 120 of the present embodiment in the fuse packaging stage.

FIG. 12 is a circuit diagram explaining a schematic configuration of the security information packaging system 120 of the present embodiment in the fuse packaging stage. In this stage, the fuse packaging vendor C 240 packages individually IDfuse as the security information, which is licensed by the security information license company 220, into any LSI. In this stage, the function test is also executed by using the test value while setting the test signal TEST to "1". The validity of the fuse writing is checked by the comparing test with the CRC value after the test signal TEST is set to "0".

As shown in FIG. 12, the fuse writing into the LSI 120*b* is executed from the IDfuse packaging system 300 provided to the outside of the security information packaging system 120. That is, IDfuse/address is written into the first constant storing circuit 132 of the seed generating circuit 131 and CRCfuse is written into the third constant storing portion 166 of the verifying circuit 165.

Like the LSI developing stage shown in FIG. 11, the function test of the LSI 120*b* is executed by the second constant IDtst for testing and the testing verification constant CRCtst after the test signal TEST is set to "1".

Meanwhile, the validity of the fuse writing is checked by setting the test signal TEST to "0". At this time, the first selector receives "0" as the test signal TEST and outputs selectively the first constant IDfuse/address stored in the first constant storing circuit 132. Also, the second selector 167 receives "0" as the test signal TEST and outputs selectively the verification constant CRCfuse/address stored in the third constant storing portion 166.

The output of the first selector 133 is input into the comparing circuit 168 in the verifying circuit 165. The comparator circuit 168 checks whether or not the result of the redundancy calculation of the output of the first selector 133 is identical to CRCfuse/address that is fuse-packaged in the third constant storing circuit 166. Then, if the comparator circuit 168 senses the inconsistency, an operation of the second decrypting circuit Y 34 is stopped. Accordingly, the validity of the first constant IDfuse/address stored in the seed generating portion 131 can be verified.

Figure 13:
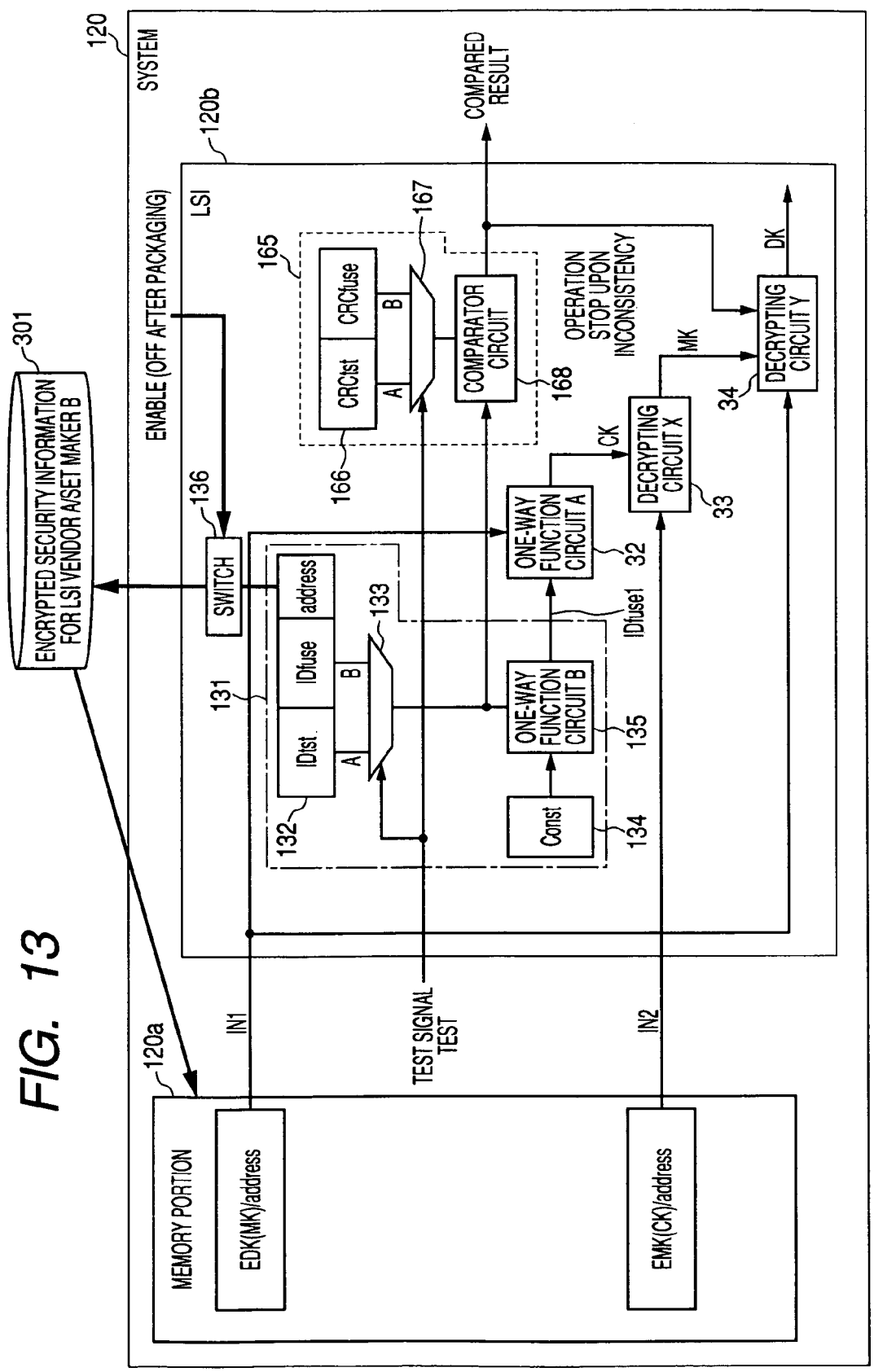
FIG. 13 is a circuit diagram explaining a schematic configuration of the security information packaging system 120 of the present embodiment in the security information packaging stage into the set.

FIG. 13 is a circuit diagram explaining a schematic configuration in the security information packaging stage into the set in the security information packaging system 120 of the present embodiment. The set maker B 250 packages the encrypted security information (parameter), which is licensed by the security information license company 220, into the memory portion 120*a* based on the address being output from the LSI 120*b*.

That is, as shown in FIG. 13, an encrypted security information packaging system 301 is provided to the outside of the security information packaging system 120. While, a switch 136 that is able to output the address, which has a correlation with the first constant IDfuse in the first constant storing portion 132 in the seed generating portion 131, to the encrypted security information packaging system 301 is provided to the inside of the LSI 120b.

The switch 136 is used only in the set maker B 250 in the stage in which the corresponding encrypted security information is packaged in the memory portion 120a based on the address being output from the LSI 120b. It is desired that the address information should not be output to the outside by the fuse cutting by applying the overvoltage, or the terminal fixing, or the like after the encrypted security information is packaged in the memory portion 120a.

The encrypted security information packaging system 301 reads the address having a correlation with the first constant IDfuse from the switch 136, and then writes the encrypted security information, which is positioned at the designated address in the database in the encrypted security information packaging system 301, into the memory portion 120a of the security information packaging system 120. FIG. 13 shows a state in which the first encrypted security information EDK (MK)/address and the second encrypted security information EMK(CK)/address are stored.

Then, a setting operation (in the normal operation) is checked. In this case, the test signal TEST is set to "0". At this time, the first selector 133 receives "0" as the test signal TEST and then output selectively the first constant IDfuse/address stored in the first constant storing circuit 132.

The second one-way function circuit B 135 converts the third constant Const as the LSI maker key stored in the second constant storing portion 134 by the one-way function using the output of the first selector 133, i.e., the first constant IDfuse/address. Accordingly, the conversion seed IDfuse1 is output from the seed generating portion 131.

Then, the first one-way function circuit A 32 converts the conversion seed IDfuse1 output from the seed generating portion 131 by the one-way function that is equivalent to that used to generate the converted security information CK, while using the first encrypted security information EDK (MK)/address. Accordingly, the converted security information CK is generated/output from the first one-way function circuit A 32.

The first decrypting circuit X 33 decrypts the second encrypted security information EMK(CK)/address by using the output of the first one-way function circuit A 32, i.e., the converted security information CK as a key. Accordingly, the internal security information MK is generated/output from the first decrypting circuit X 33. The second decrypting circuit Y 34 decrypts the first input IN1, i.e., the first encrypted security information EDK(MK)/address by using the output of the first decrypting circuit X 33, i.e., the internal security information MK as a key. Accordingly, the final security information DK is generated/output from the second decrypting circuit Y 34.

At this time, the second selector 167 receives "0" as the test signal TEST and then outputs selectively the verification constant CRCfuse/address stored in the third constant storing portion 166. The output of the second selector 167 is input into the comparator circuit 168. The output of the first selector 133 is also input into the comparator circuit 168. The comparator circuit 168 executes the comparing test, and stops the operation of the second decrypting circuit Y 34 if the result is inconsistent. Accordingly, the validity of the first constant IDfuse/address stored in the seed generating portion 131 can be verified.

Embodiment 2

Figure 14:
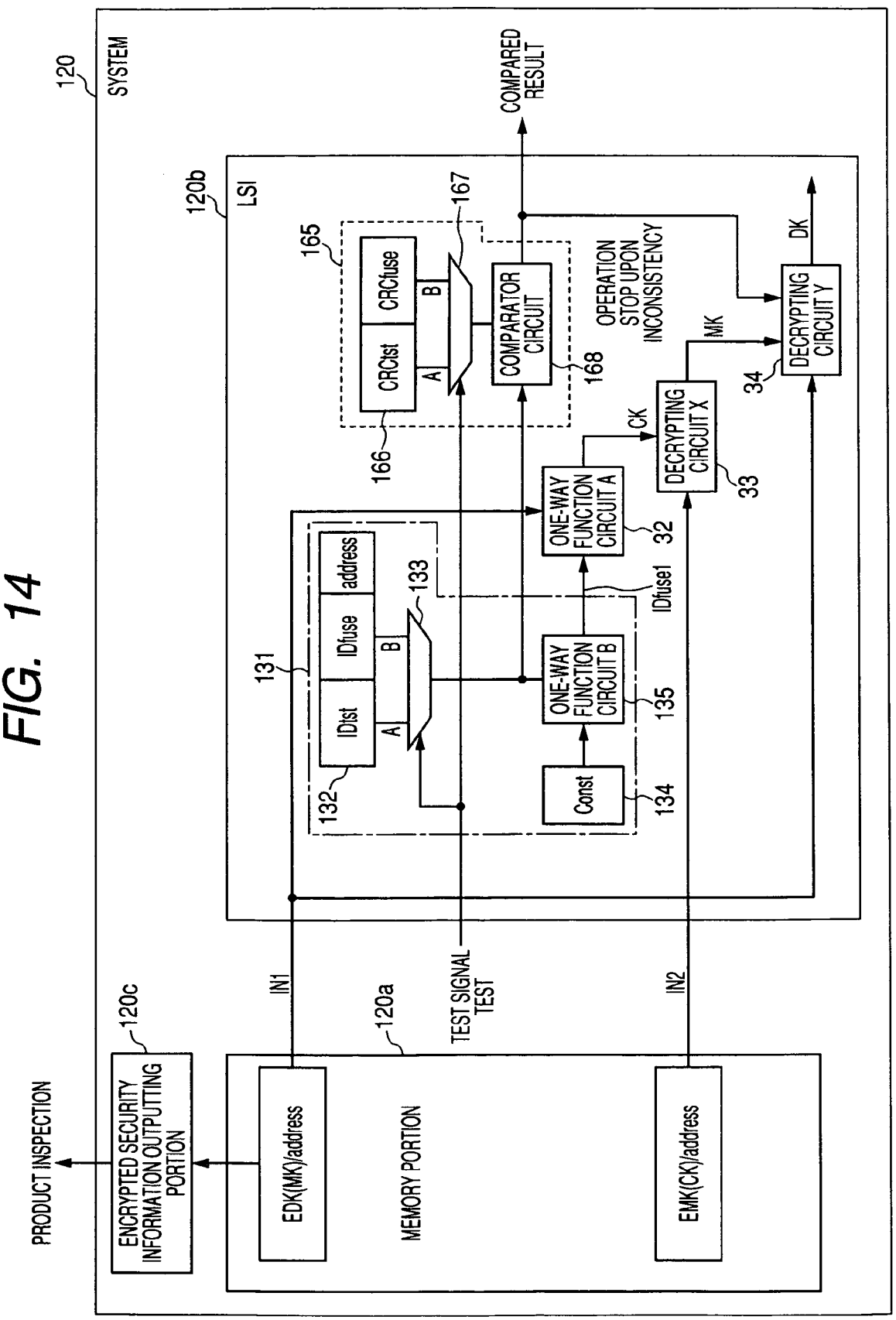
FIG. 14 is a block diagram showing a schematic configuration in the case where a first encrypted security information EDK(MK)/address stored in a memory portion 120a is utilized in the product inspection, in the security information packaging system 120 of the present embodiment.

FIG. 14 is a block diagram showing a schematic configuration in the case where the first encrypted security information EDK(MK)/address stored in the memory portion 120a is utilized in the product inspection, in the security information packaging system 120 of the present embodiment. In the security information packaging system 120 of the present embodiment, an encrypted security information outputting portion 120c that is able to output the first encrypted security information EDK(MK)/address stored in the memory portion 120a is provided in addition to the same configuration as that in FIG. 13.

A radio transmitting portion for outputting the first encrypted security information EDK(MK)/address stored in the memory portion 120a by a radio tag, for example, is provided to the encrypted security information outputting portion 120c. The effective product inspection can be carried out by reading such information by a radio tag reader provided on the outside.

Alternately, a data converting portion for converting the first encrypted security information EDK(MK)/address stored in the memory portion 120a into data that can be sent out to the network may be provided to the encrypted security information outputting portion 120c. When doing this, the security information of the terminal device can be managed by the server of the security information license company 220 via the network and therefore the copyright of the contents that is played by the terminal device can be managed collectively.

Also, if the address corresponding to the IDfuse value that is the constant peculiar to the LSI is output to the outside of LSI, a pair of the encrypted security information (parameter) and the address can be attained. As a result, the LSI as the flown-out source can be specified by the encrypted security information that illegally flows out, and thus the management of the encrypted security information can be tighten.

In addition, the random-number characteristic of the IDfuse value packaged in LSI can be guaranteed if the first encrypted security information EDK(MK)/address that is different every piece is checked. Since the LSI vendor cannot apply the same IDfuse value to some other purpose because of the guarantee of the random-number characteristic, a license fee or a copyright fee can be imposed to respective manufactured terminal devices and thus the copyright protection can be strengthen.

Embodiment 3

Figure 15:
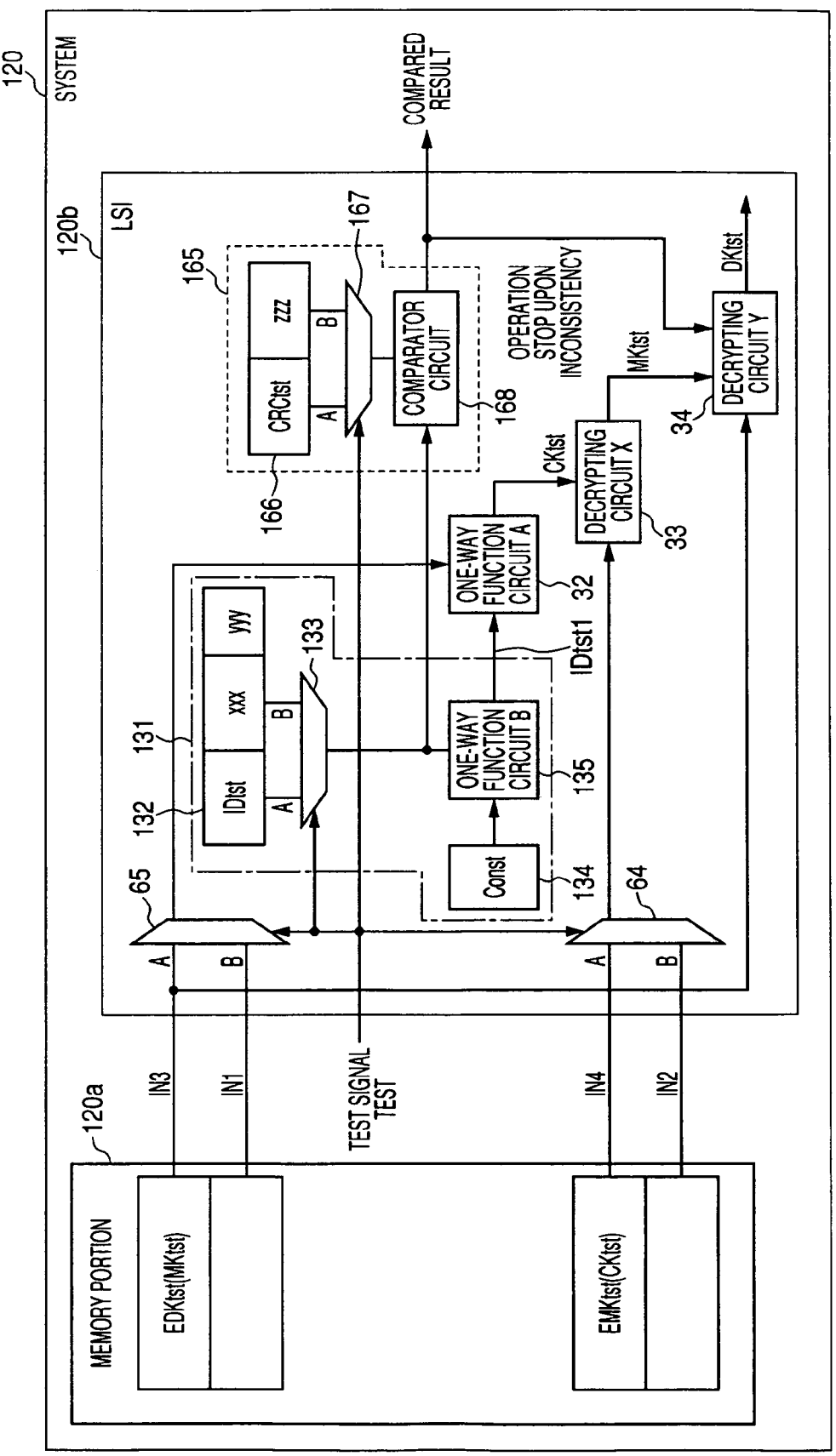
FIG. 15 is a view showing a configuration in which third and fourth selectors 65, 64 capable of selecting the encrypted security information for testing are added, in the security information packaging system 120 of the present embodiment.
Figure 16:
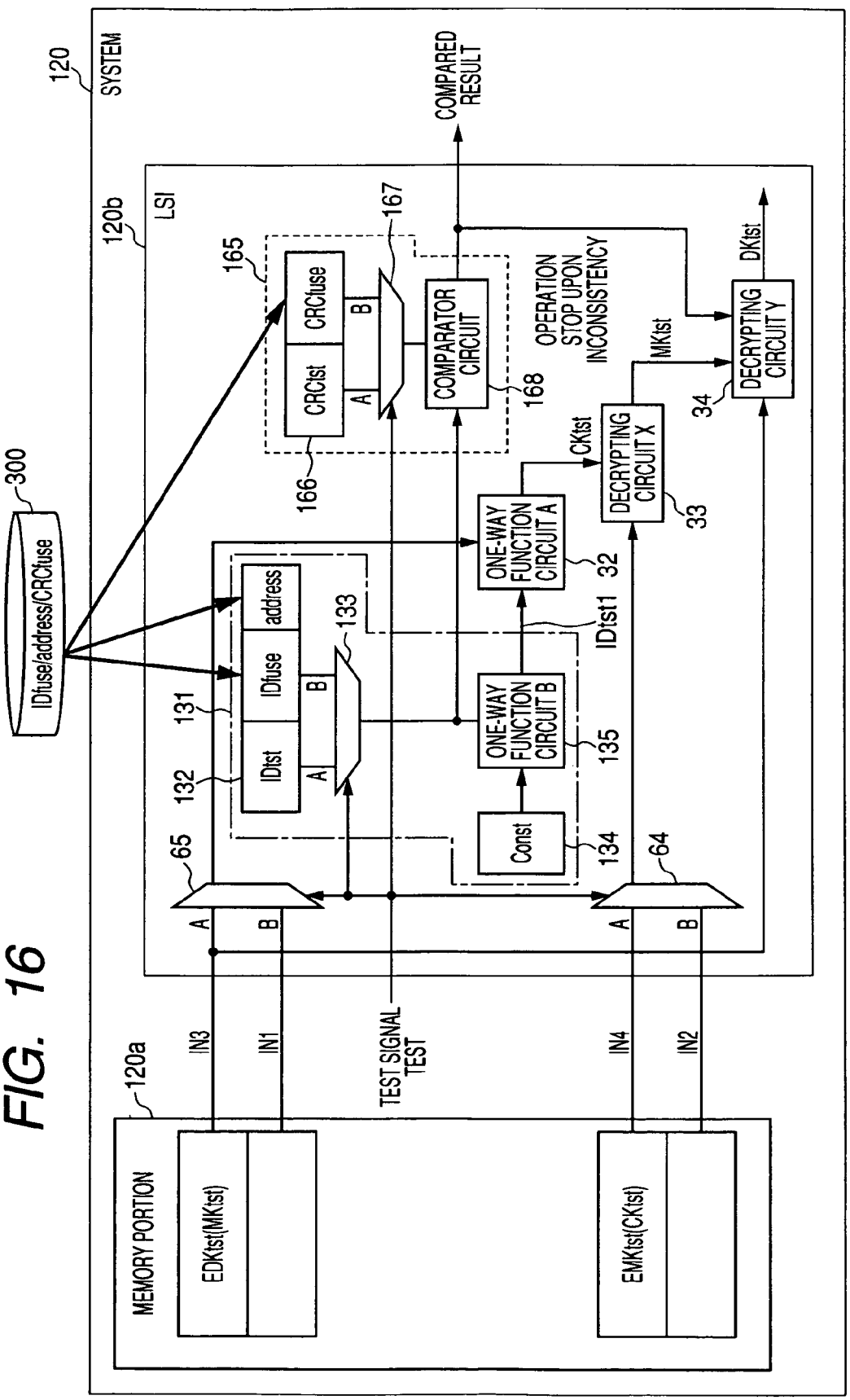
FIG. 16 is a view showing a configuration in which the third and fourth selectors 65, 64 capable of selecting the encrypted security information for testing are added, in the security information packaging system 120 of the present embodiment.
Figure 17:
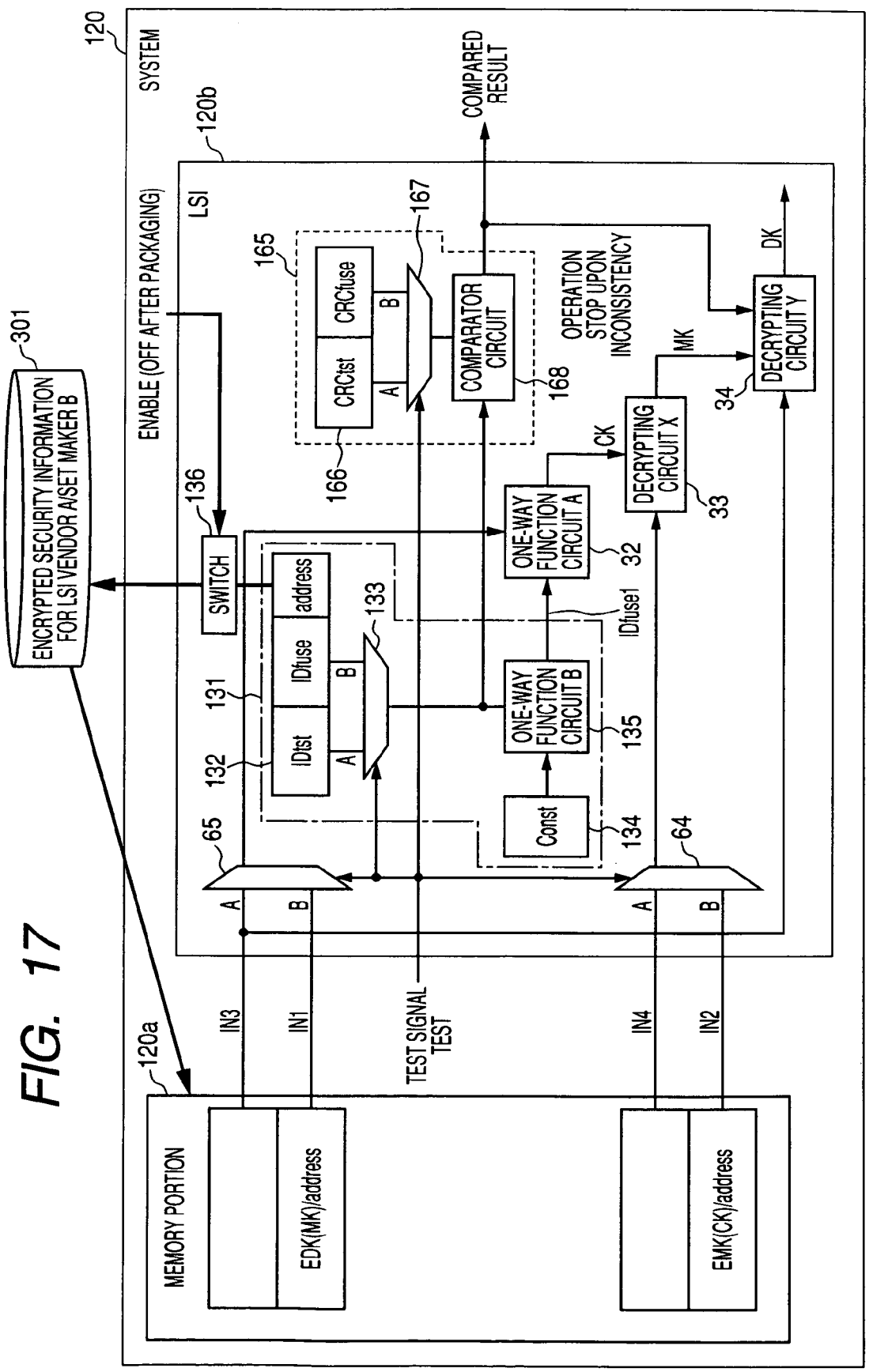
FIG. 17 is a view showing a configuration in which the third and fourth selectors 65, 64 capable of selecting the encrypted security information for testing are added, in the security information packaging system 120 of the present embodiment.

FIG. 15, FIG. 16 and FIG. 17 show respectively a configuration in which third and first selectors 65, 64 capable of selecting the encrypted security information for testing are added to test effectively the security information packaging system 120 of the present embodiment in respective manufacturing processes.

More particularly, as shown in FIG. 15, a third selector 65 that selects one of the first encrypted security information for testing EDKtst(MKtst) stored in the memory portion 120a and the first encrypted security information EDK(MK)/address loaded by the set maker B 250 in response to the test signal TEST and then outputs the selected information to the first one-way function circuit A 32, and the first selector 64 that selects one of the second encrypted security information for testing EMKtst(CKtst) stored in the memory portion 120*a* and the second encrypted security information EMK(CK)/ address loaded by the set maker B 250 in response to the test signal TEST and then outputs the selected information to the first decrypting circuit X 33 are provided to the LSI 120*b*.

Then, in the case where the testing is executed by the LSI vendor A 230 and the Fuse packaging vendor C 240, the test signal TEST is set to "1" and then the first encrypted security information for testing EDKtst(MKtst) and the second encrypted security information for testing EMKtst(CKtst) are selected by the third and first selectors 65, 64.

Also, as shown in FIG. 17, in the case where the testing is executed by the set maker B 250, the test signal TEST is set to "0" and then the first encrypted security information EDK (MK)/address and the second encrypted security information EMK(CK)/address are selected by the third and first selectors 65, 64.

In this fashion, according to the security information packaging system 120 of the present embodiment, the testing in respective processes can be executed effectively according to the setting of the test signal TEST. In this case, since operations in the LSI 120*b* are similar to those of Embodiment 1, their explanation will be omitted herein.

Embodiment 4

Figure 18:
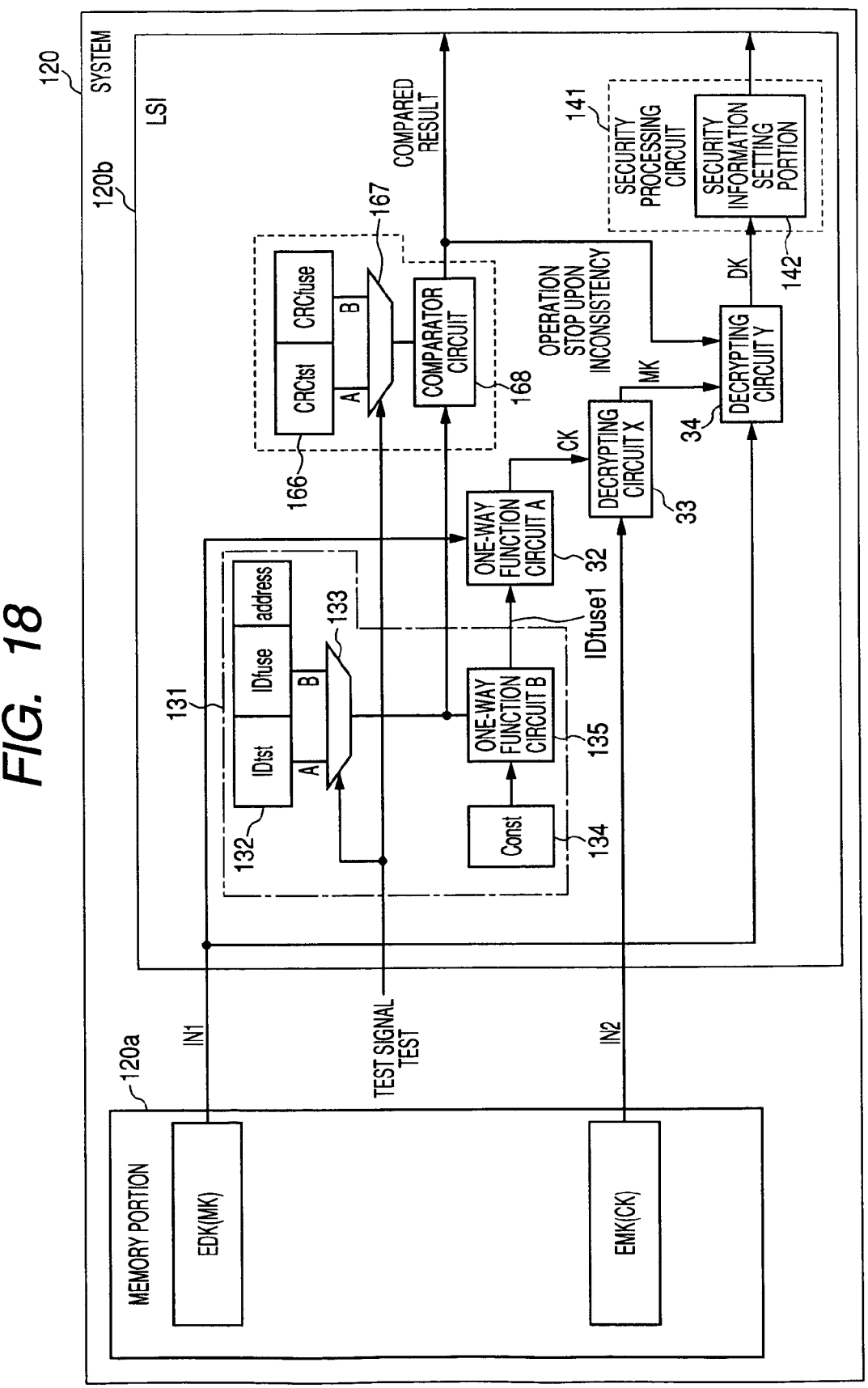
FIG. 18 is a view showing a configuration in which an encrypting block 141 for receiving the final security information DK output from a second decrypting circuit Y34 as an input is provided to an LSI 120b, in the security information packaging system 120 of the present embodiment.
Figure 19:
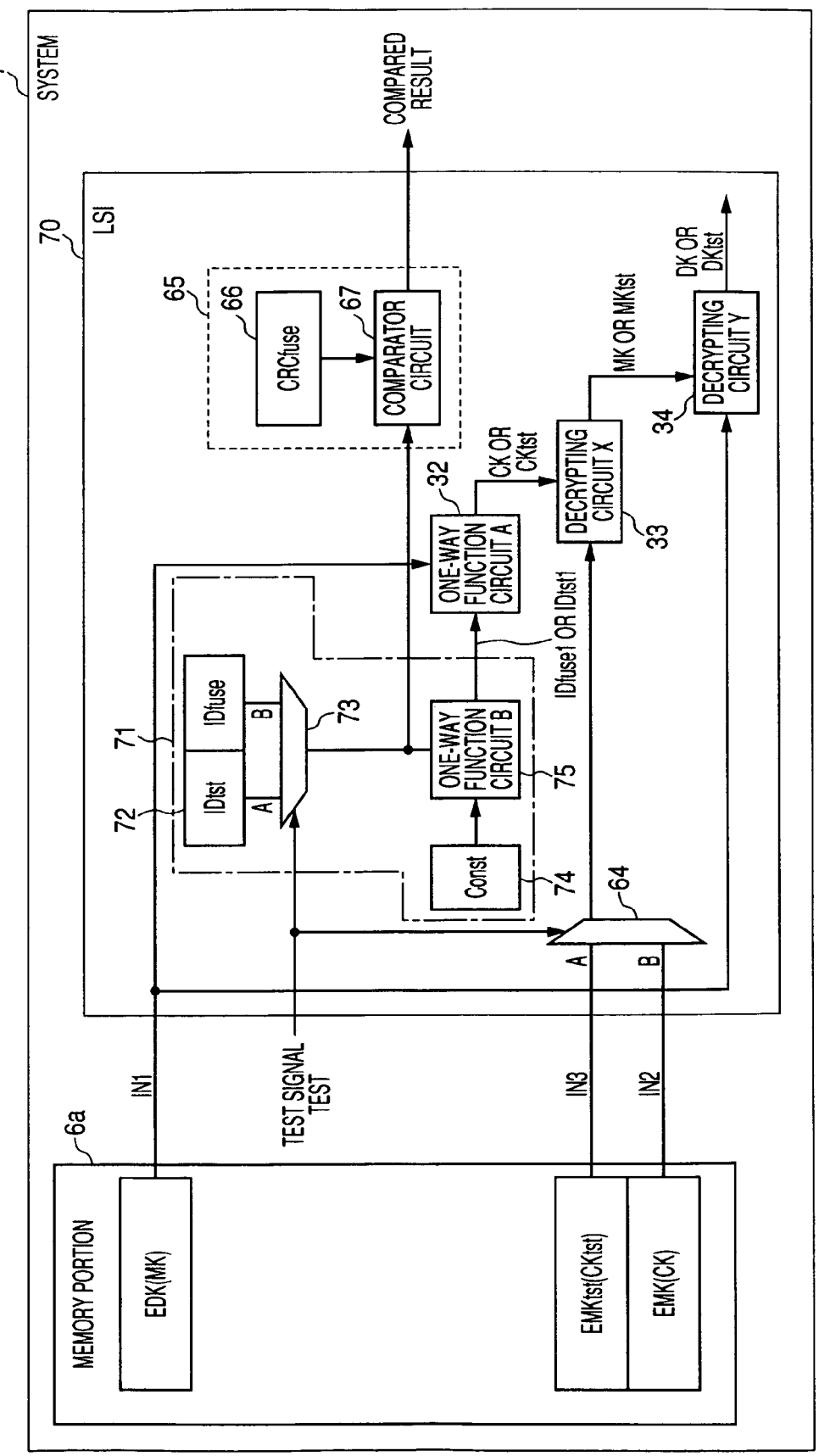
FIG. 19 is a block diagram showing a schematic configuration to explain a key packaging system 7.
Figure 20:
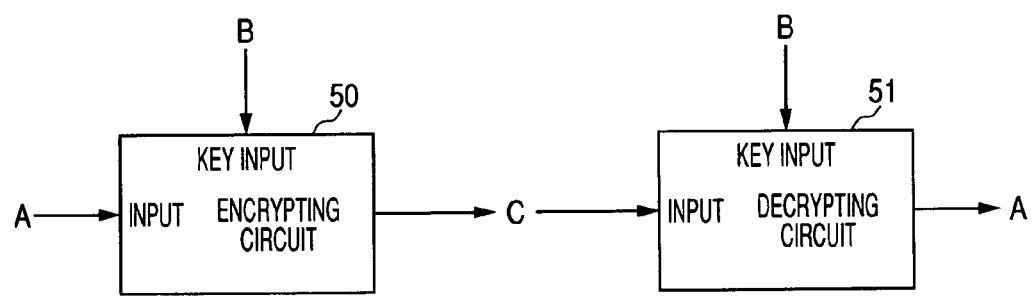
FIG. 20 is a view explaining the characteristic of the symmetric cryptosystem.

FIG. 18 shows a configuration in which an encrypting block 141 for receiving the final security information DK, which is output from the second decrypting circuit Y 34, as an input is provided to the LSI 120*b*, in the security information packaging system 120 of the present embodiment.

The security processing circuit 141 encrypts the final security information DK in compliance with the same encryption algorithm as the present embodiment or other encryption algorithms, and then outputs OK/NG signals to other block of the terminal device into which the LSI 120*b* is packaged, for example.

Embodiment 5

Figure 21:
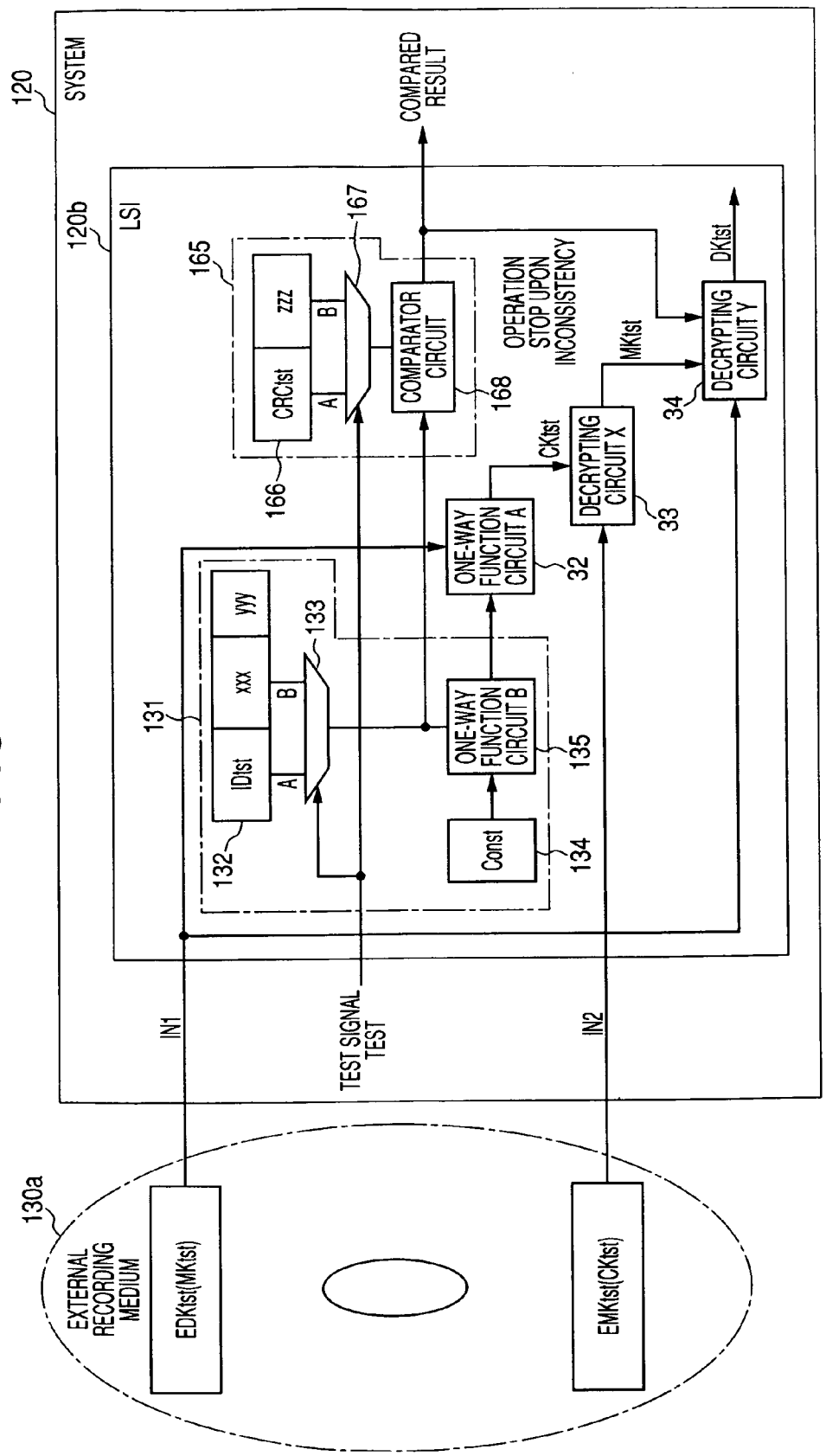
FIG. 21 is a view showing a configuration in which an external recording medium 130a that can be detachably attached to the system 120 is used in place of the memory portion 120a, in the security information packaging system 120 of the present embodiment.

FIG. 21 shows a configuration in which an external recording medium 130*a* that can be detachably attached to the system 120 is used in place of the memory portion 120*a*, in the security information packaging system 120 of the present embodiment.

According to the present embodiment, since the final security information DK is not output to the outside of the LSI 120*b* or since the final security information DK is further encrypted by the encryption algorithm, the concealability of the final security information DK can be improved further.

The security information packaging system, the LSI, the memory device, and the security information packaging method of the present invention have effects of capable of specifying the maker who manufactured the terminal device, the system LSI, or the memory portion based on the illegally flown-out terminal device, the system LSI, or the memory portion by correlating the encrypted security information with the address information and also capable of achieving the strict management of the security information. Thus, these are available as the technology connected with the system in which the key is packaged and the LSI used therein, and so forth.

What is claimed is:

1. A security information packaging system comprising:
an LSI including:
a storing portion, for storing a first encrypted security information obtained by encrypting an final security information by an internal security information and a second encrypted security information obtained by encrypting the internal security information by using a converted security information;
a seed generating portion, for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal,
a first one-way function circuit, for converting the conversion seed and the conversion seed for testing output from the seed generating portion by the first encrypted security information input from the storing portion to generate the converted security information or the converted security information for testing,
a first decrypting circuit for decrypting the second encrypted security information input from the storing portion by using an output of the first one-way function circuit as a key, and
a second decrypting circuit for decrypting the first encrypted security information input from the storing portion by using an output of the first decrypting circuit as a key,
wherein the first constant and the second constant are separately selected and have no relationship with each other.

2. The security information packaging system according to claim 1, wherein the seed generating portion has
a first constant storing portion for storing the first constant and the second constant,
a first selector for selectively outputting the first constant or the second constant in response to the test signal,
a second constant storing portion for storing the third constant, and
a second one-way function circuit for converting the third constant by the one-way function using an output of the first selector, and then outputting the conversion seed or the conversion seed for testing in response to the test signal.

3. The security information packaging system according to claim 2, wherein the LSI includes a verifying circuit for verifying the first constant or the second constant stored in the seed generating portion in response to the test signal.

4. The security information packaging system according to claim 3, wherein the verifying circuit has
a third constant storing portion for storing a fourth constant corresponding to a result of a redundancy calculation of the first constant and a fifth constant corresponding to a result of a redundancy calculation of the second constant,
a second selector for selectively outputting the fourth constant or the fifth constant in response to the test signal, and
a comparator circuit for comparing a result of a redundancy calculation of the output of the first selector with an output of the second selector.

5. The security information packaging system according to claim 4, wherein the second decrypting circuit stops an operation when the comparator circuit senses an inconsistency.

6. The security information packaging system according to claim 1, wherein the LSI includes a switch circuit for outputting the address information contained in the first constant in response to a control signal.

7. The security information packaging system according to claim 6, wherein the switch circuit disables an output of the address information after the address information is output.

8. The security information packaging system according to claim 6, wherein the first encrypted security information and the second encrypted security information stored in the storing portion are correlated with the address information output from the switch circuit.

9. The security information packaging system according to claim 1, wherein the final security information and the internal security information are correlated with the address information.

10. The security information packaging system according to claim 1, wherein the storing portion includes an encrypted security information outputting portion for outputting the first encrypted security information stored in the storing portion.

11. The security information packaging system according to claim 1, wherein the LSI includes
a third selector for selecting the first encrypted security information stored in the storing portion or a first encrypted security information for testing in response to the test signal, and outputting selected information to the first one-way function circuit, and
a fourth selector for selecting the second encrypted security information stored in the storing portion or a second encrypted security information for testing in response to the test signal, and outputting selected information to the first decrypting circuit.

12. The security information packaging system according to claim 1, further comprising:
a security processing circuit block for applying a security process such as an encrypting process, a tamper detecting process, or the like to the output of the second decrypting circuit.

13. The security information packaging system according to claim 1, wherein the first constant has a random-number characteristic every piece, and a function of testing the random-number characteristic by the encrypted security information outputting portion set forth in claim 10 is provided.

14. The security information packaging system according to claim 1, wherein the first constant is a constant that is peculiar to each piece of the LSI or a predetermined number of pieces.

15. The security information packaging system according to claim 1, wherein the third constant is a constant that is peculiar to a maker who develops and manufactures the LSI.

16. The security information packaging system according to claim 1, wherein the final security information is a constant that is peculiar to a maker who develops and manufactures the system.

17. The security information packaging system according to claim 1, wherein the first encrypted security information and the second encrypted security information are stored in an external storing medium.

18. A security information packaging method of packaging security information into a system having a storing portion and an LSI, comprising the steps of:
storing a first encrypted security information obtained by encrypting a final security information by using an internal security information and a second encrypted security information obtained by encrypting the internal security information by using converted security information into the storing portion; and
packaging the LSI, which includes a seed generating portion for storing a first constant containing address information and serving as a generation source of a conversion seed, a second constant serving as a generation source of a conversion seed for testing, and a third constant and then outputting the conversion seed and the conversion seed for testing obtained by converting the third constant based on a one-way function using the first constant or the second constant in response to a test signal, a first one-way function circuit for converting the conversion seed and the conversion seed for testing output from the seed generating portion by the first encrypted security information to generate the converted security information or the converted security information for testing, a first decrypting circuit for decrypting the second encrypted security information by using an output of the first one-way function circuit as a key, and a second decrypting circuit for decrypting the first encrypted security information by using an output of the first decrypting circuit as a key, into the system.

19. A security information generating system having a function of inputting the first constant, the third constant, the final security information and the converted security information set forth in claim 1, and then outputting the first encrypted security information and the second encrypted security information to be correlated with the address.

20. The security information generating system according to claim 19 having a function of outputting the fourth constant set forth in claim 4.

21. A security information generating system having a function of inputting the second constant, the third constant, the testing security information and the converted security information for testing set forth in claim 1, and then outputting the first encrypted security information and the second encrypted security information.

22. The security information generating system according to claim 21 having a function of outputting the fifth constant set forth in claim 4.

23. A security information generating method of inputting the first constant, the third constant, the final security information and the converted security information set forth in claim 1, and then outputting the first encrypted security information and the second encrypted security information to be correlated with the address.

24. The security information generating method according to claim 23 of outputting the fourth constant set forth in claim 4.

25. A security information generating method of inputting the second constant, the third constant, the testing security information and the converted security information for testing set forth in claim 1, and then outputting the first encrypted security information and the second encrypted security information.

26. The security information generating method according to claim 25 of outputting the fifth constant set forth in claim 4.

27. A security information distributing method of scattering/distributing respective information to a maker who conducts LSI development/manufacture and a maker who conducts system development/manufacture by using the security information generating method set forth in any one of claim 23 to claim 26.

28. An LSI into which first encrypted security information obtained by encrypting a final security information by using an internal security information and a second encrypted security information obtained by encrypting the internal security information by using a converted security information are input, comprising:
a seed generating portion, for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal;

a first one-way function circuit, for converting the conversion seed and the conversion seed for testing output from the seed generating portion by the first encrypted security information to generate the converted security information or the converted security information for testing;

a first decrypting circuit, for decrypting the second encrypted security information by using an output of the first one-way function circuit as a key; and a second decrypting circuit for, decrypting the first encrypted security information by using an output of the first decrypting circuit as a key.

29. The LSI according to claim 28, further comprising:

a verifying circuit for verifying the first constant or the second constant stored in the seed generating portion in response to the test signal.

30. A storing device for supplying first encrypted security information and second encrypted security information to an LSI, the LSI including:

a seed generating portion, for storing a first constant containing address information and serving as a generation source of a conversion seed, a second constant serving as a generation source of a conversion seed for testing, and a third constant, and then outputting the conversion seed and the conversion seed for testing obtained by converting the third constant based on a one-way function using the first constant or the second constant in response to a test signal, a first one-way function circuit, for converting the conversion seed and the conversion seed for testing output from the seed generating portion by the first encrypted security information to generate the converted security information or the converted security information for testing, a first decrypting circuit for decrypting the second encrypted security information by using an output of the first one-way function circuit as a key, and a second decrypting circuit for decrypting the first encrypted security information by using an output of the first decrypting circuit as a key, and wherein the first encrypted security information is obtained by encrypting final security information by using internal security information, and the second encrypted security information is obtained by encrypting the internal security information by using the converted security information.

* * * * *